(12) United States Patent
Gamzin

(10) Patent No.: US 10,079,888 B2
(45) Date of Patent: Sep. 18, 2018

(54) GENERATION AND USE OF NUMERIC IDENTIFIERS FOR LOCATING OBJECTS AND NAVIGATING IN SPATIAL MAPS

(71) Applicant: Naviworld Limited

(72) Inventor: Michael Gamzin, Moscow (RU)

(73) Assignee: Naviworld Limited, Limassol (CY)

( * ) Notice: Subject to any disclaimer, the term of this patent is extended or adjusted under 35 U.S.C. 154(b) by 211 days.

(21) Appl. No.: 15/048,999

(22) Filed: Feb. 19, 2016

(65) Prior Publication Data

US 2016/0245656 A1 Aug. 25, 2016

Related U.S. Application Data

(60) Provisional application No. 62/118,939, filed on Feb. 20, 2015, provisional application No. 62/196,859, filed on Jul. 24, 2015.

(51) Int. Cl.
| | |
|---|---|
| *H04L 29/08* | (2006.01) |
| *G06F 9/451* | (2018.01) |
| *G01C 21/32* | (2006.01) |
| *G06F 17/30* | (2006.01) |
| *G06F 9/44* | (2018.01) |
| *G06F 9/455* | (2018.01) |
| *G09B 5/06* | (2006.01) |

(52) U.S. Cl.
CPC ......... *H04L 67/1097* (2013.01); *G01C 21/32* (2013.01); *G06F 9/4445* (2013.01); *G06F 9/452* (2018.02); *G06F 9/45558* (2013.01); *G06F 17/30* (2013.01); *G09B 5/06* (2013.01)

(58) Field of Classification Search
CPC .................................................. H04L 67/1097
USPC ......................................................... 709/203
See application file for complete search history.

(56) References Cited

U.S. PATENT DOCUMENTS

| | | | |
|---|---|---|---|
| 2010/0153418 A1* | 6/2010 | Asher ............... | G06F 17/30241 707/758 |
| 2011/0053559 A1* | 3/2011 | Klein ..................... | G07C 13/00 455/411 |

\* cited by examiner

*Primary Examiner* — Adnan Mirza
(74) *Attorney, Agent, or Firm* — One LLP; Jonathan Jaech

(57) ABSTRACT

A computer system implements novel addressing algorithms to translate different types of non-network addresses requested by distributed clients into unique numeric addresses device of language-specific alphabetic characters. The non-network addresses may locate different objects in different addressing or locating systems for physical and virtual objects or locations. The computer system, working in cooperation with distributed clients, assists users who supply the unique numeric addresses with locating the different objects or locations in the different systems.

25 Claims, 16 Drawing Sheets

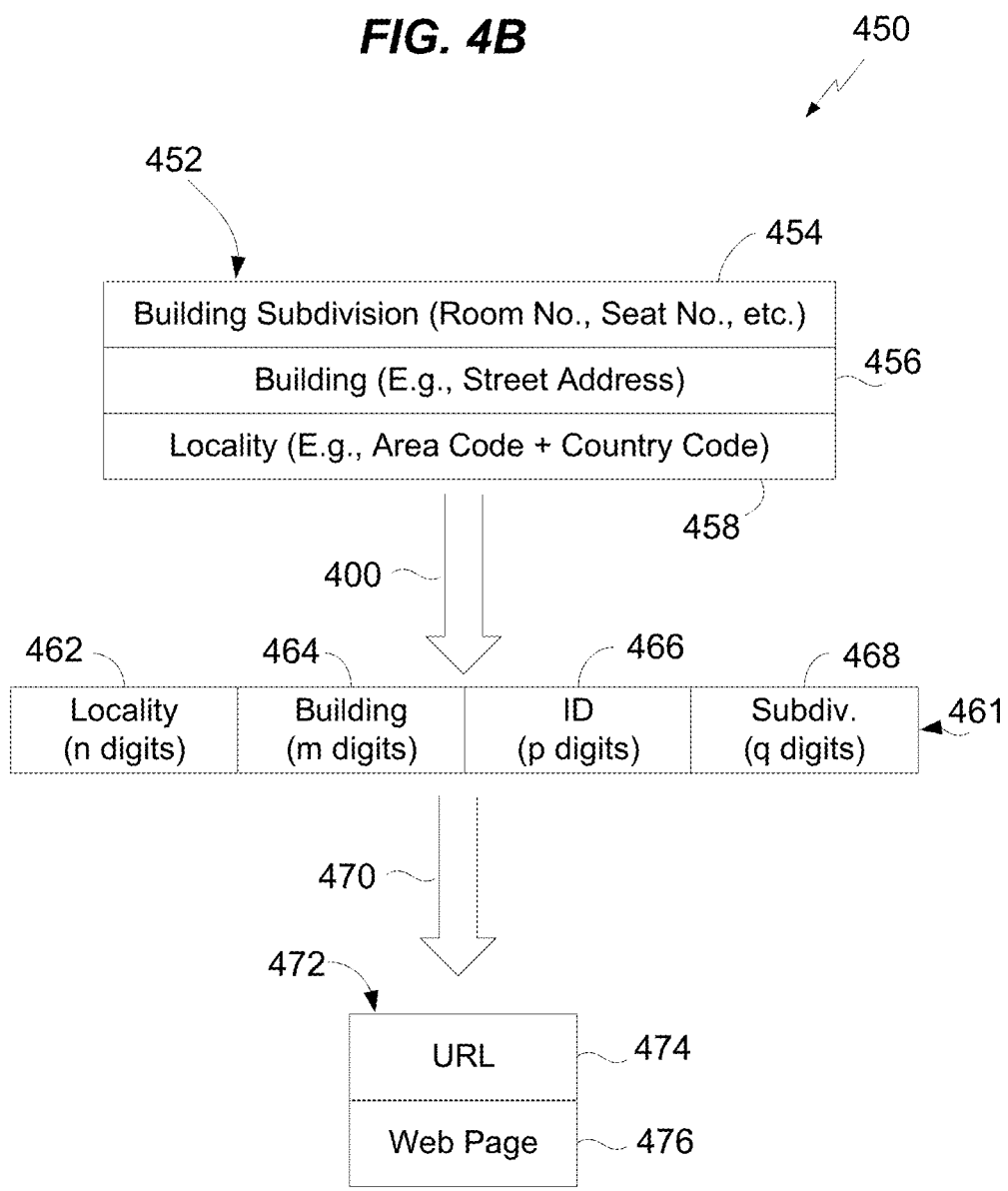

FIG. 7
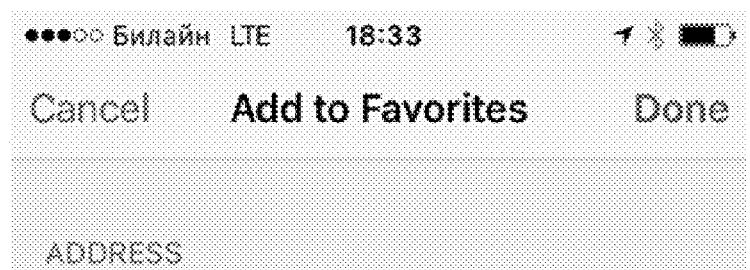
102, West 1st Street, Downtown, Los... — 702
(1213) 9177 — 704
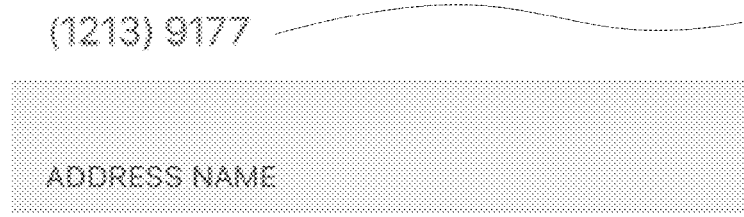
Best place for lunch — 706
Right around corner — 708
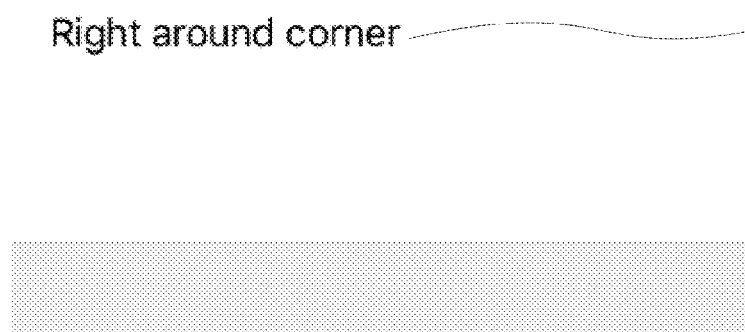

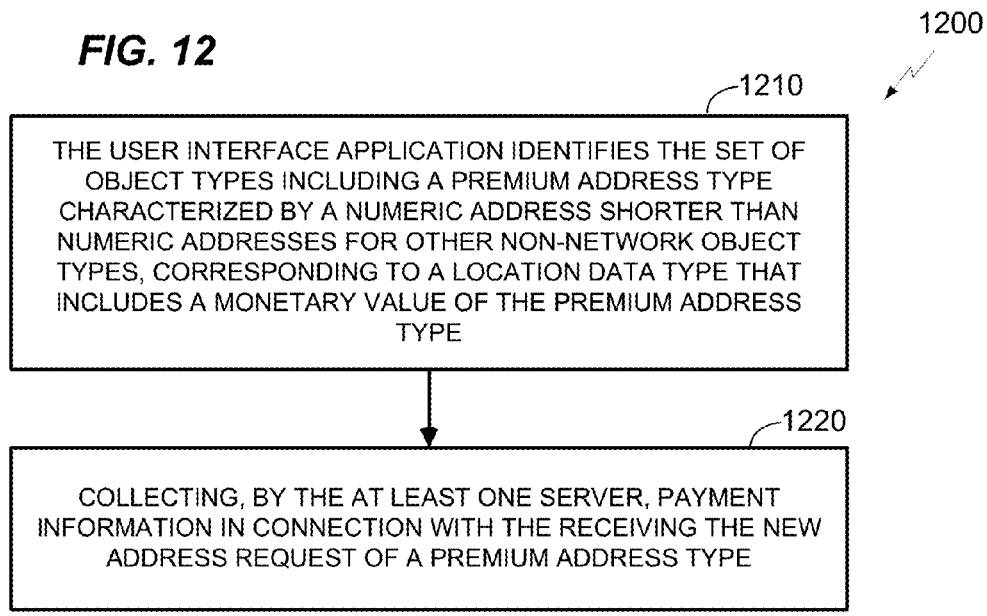
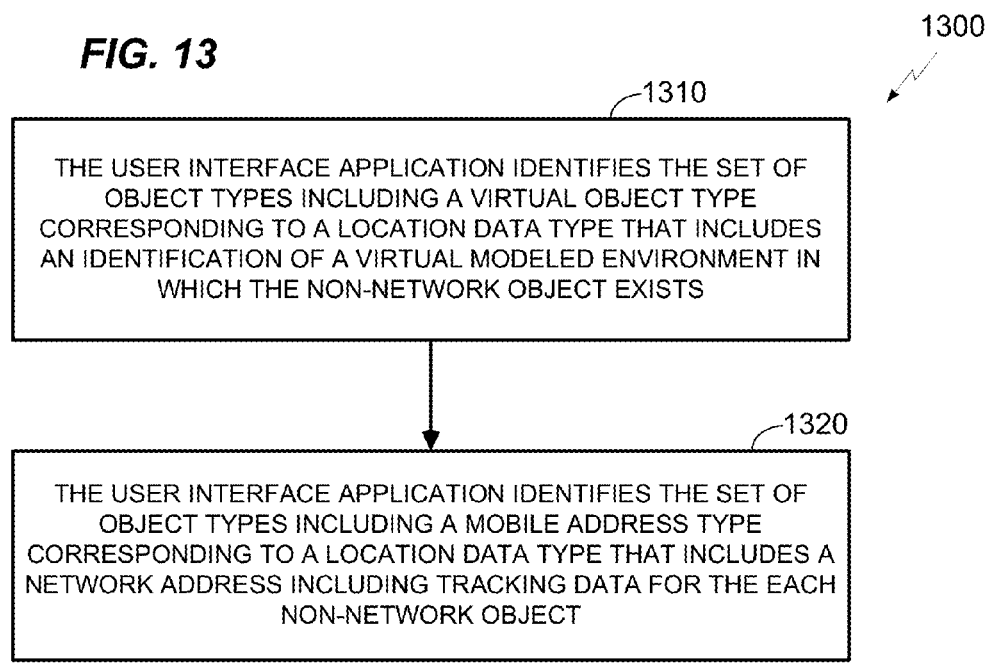

GENERATION AND USE OF NUMERIC IDENTIFIERS FOR LOCATING OBJECTS AND NAVIGATING IN SPATIAL MAPS

CROSS REFERENCE TO RELATED APPLICATIONS

This application claims priority pursuant to 35 U.S.C. § 119(e) to U.S. provisional application Ser. No. 62/118,939 filed Feb. 20, 2015, and Ser. No. 62/196,859 filed Jul. 24, 2015, which references are hereby incorporated by reference, in their entireties.

FIELD

The present disclosure relates to methods, apparatus and systems for for locating objects and navigating in spatial maps, for example, an electronic device and system for locating and navigating using numeric identifiers generated in specific ways to specify addresses that are geographically mapped.

BACKGROUND

Development of electronic and computer technology, as well as telecommunication facilities has a large impact on the lifestyle of people. A steady trend towards miniaturization of electronic devices and their increased mobility allows to quickly and efficiently solve the tasks of location of moving and non-moving objects. Computer technology has been widely used to solve household issues and to entertain. Modern computer games present vast and complex virtual environments, and object location in them can be identified in different ways. Finally, modern mobile and portable electronic devices allow to provide images of objects that do not exist in the real world using the augmented reality means. Identification of location of such virtual objects in the real world is becoming an increasingly relevant issue as well.

A wide range of the above tasks associated with identification of location of a random object in a random place and time is indicative of the necessity to create a unified ("universal") location identification system. Various locating systems are known.

For example, known systems include cellular wireless networks. In the last 20 years, popularity and application of mobile terminals, or mobile telephones that people carry on them everywhere and use to perform multiple functions, have been increasing rapidly. As it is known, a cellular system is based on cells, or coverage regions, that can be defined as certain geographically limited areas serviced by base transceiver stations. At the same time, such cellular network architecture can be used to identify location of a mobile station, and, correspondingly, of its user within its coverage area. It is known that location identification service can be based on a cell's coverage area, or a service area. However, the identification name of a base station is difficult to memorize as it is made of a sequence of digits. Besides, different operators have different numbering systems for areas, and the size of each cellular area is fixed and may cover an area that is too large to achieve a desired precision.

Known systems may further include, for example, geocoding. Geocoding assigns coordinates, for example, latitude and longitude, to an actual mailing address. Different geocoding systems are based at least on the geographic information system (GIS), where street network has references to geographic coordinates. However, a mailing address shows poor accuracy when solving a number of tasks: for example, a mailing address does not always specify the building entrance number or the floor number. For more accurate location identification one can use geographic coordinates provided in the form of latitude and longitude, however, in this case such a sequence of digits is difficult for people to memorize, and it is easy to make a mistake when transferring it.

For further example, some approaches are based on the transformation of GPS geographic coordinates into a sequence of symbols and/or words. For example, a method for producing a location identifier has been described. The method include operations of: obtaining the geographic coordinates of a location, converting the geographic coordinates into single unique value n; converting the value n into a unique group of a plurality of values; converting the plurality of values into an equal plurality of respective words; and providing the plurality of words as a location identifier. The location identification method comprises a reverse sequence of operations obtaining the geographic coordinates.

A system for translating geographic coordinates into an easy to memorize word combination has also been described. The approach may include a program implemented on a computer, using which the computer translates inputted geographic coordinates into a word combination as well as translates the word combination back into the geographic coordinates. A user may use a mobile computing device to determine the coordinates of a location, the program may translate the coordinates to the word combination, and then the user may memorize the word combination displayed by the mobile computing device for later use.

However, solutions based on transformation of GPS geographic coordinates into a sequence of symbols and/or words are not universal, or, to be more precise, they are used to transform geographic coordinates only, and are not capable of distinguishing between different objects having the same geographic coordinates, or of handling a moving object that is located by different coordinates at different times.

Known systems may further include, for example, geotagging. Geotagging method involves assigning word identification to geographic coordinates, stored in metadata of a photograph. Geotagging is used to find information associated with a certain location. For example, one may search for photographs taken near a given location by entering geotags into a search engine. A method for geotagging using barcodes has been described, including associating geotag information obtained from a barcode with image or video data. The apparatus includes a camera module for capturing an image or video of an object, a barcode decoding module for receiving barcode data related to the object and for extracting geotag information from the barcode data, and a processor for associating the geotag information with the image or video. At the same time, geographic coordinates for an object photograph geotag is obtained from a one-dimensional or two-dimensional (QR) barcode located on the object itself or near the object.

However, symbolic geotag identifications usually cannot be transferred from one application to another, as different applications use separate unrelated geotagging systems. For example, Instagram™ application has its own geotagging system, and Twitter™ applications have their own one.

Apart from geotags, various tracking systems are used to track moving objects—aircrafts and watercrafts. Such systems use symbolic identification (for example, a flight number or a ship name) to obtain geographic coordinates of the current location. However, one system is used to track aircrafts, and another one is used to track watercraft. If one takes a geotag or a symbolic identification of a craft from one system and tries to use it in another system, it won't work.

It would be desirable, therefore, to develop new technologies for locating an object in a set of spatial coordinates, or for navigating in a set of spatial coordinates, that overcomes these and other limitations of the prior art, and enhances accuracy, speed, universal applicability and usability of navigational data.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, a "Naviaddress™" method and system of universal object location identification enables use of one and the same navigational address for different systems and different applications, enabling accurate and quick object location identification on a map and in space.

Terms and expressions used in the present application may have the following meanings:

"User" means any person using the proposed object location identification system.

"Naviaddress" means a unique object identifier generated by a computer or determined by a user, and put into correspondence with coordinates in the database containing object location information. A navigational address can be represented as a sequence of symbols (alphabet, digits, etc.), and/or a graphical image (a barcode, a QR code, a fingerprint image, etc.) and/or sound, electromagnetic, and other signals. In an aspect, the Naviaddress may be a numeric address that consists entirely of numeric digits, or that consists essentially of numeric digits.

"Naviaddress Type" means a navigational address type.

"Naviaddress Service" means a design implementation of the object location identification system, where the access to the object location information storage unit is arranged via a software-implemented terminal.

"Object" means any object in the real or virtual world—building, vehicle, a person, an animal etc.

Other terms and expressions shall have the meaning usual for their context and known to persons skilled in the art.

In an aspect, the present technology provides a universal method and system for accurate and quick identification of a location, or a geographic object, or a place of interest, or any other object, including virtual objects located in a real geographic place (for example, in case of augmented reality) or on a geographic map, providing for the simple identification of an address and/or geographical location of a destination, taking into account particular features of the route to the destination and specification for different services. At the same time, the object being identified can be both moving and non-moving. The system provides the customer with an opportunity to introduce changes by himself/herself and use a more convenient identification—a Naviaddress navigation address.

Information on the object location is stored as a database entry. This entry is put into correspondence with a unique Naviaddress identifier, which may be expressed as a sequence of symbols using a versatile character set. Information on the object location may comprise geographic coordinates, altitude above sea level, mailing address, a time point, coordinates in any system of coordinates, as well as any extra information in the form of files, text, reference to other Naviaddresses, and other information required for the use of the navigational address.

An apparatus implementing a Naviaddress system may include a processor coupled to a memory and to a network interface. The processor may execute an application stored in the memory and connect, via the network interface, to a database of Naviaddresses.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings, in which like reference characters are used to identify like elements correspondingly throughout the specification and drawings.

FIG. 4B is a block diagram further illustrating aspects of a Naviaddress method and resulting numeric address.

FIGS. 5-9 are screenshots illustrating aspects of a user interface for providing Naviaddress functions by a mobile user terminal.

FIGS. 10-15 are flow diagrams illustrating aspects of a method for generation and use of numeric identifiers for locating objects and navigating in spatial maps.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

The present application discloses a universal method and system for accurate and quick identification of a location, or a geographic object, or a place of interest, or any other object, including virtual objects associated with a real geographic place (for example, in case of augmented reality) or on a geographic map, or in a virtual space, providing for the simple identification of an address and/or geographical location of a destination, taking into account particular features of the route to the destination and specification for different services. The object being identified can be moving or stationary. The system provides the customer with an opportunity to introduce changes by himself/herself and use a more convenient identification—a Naviaddress navigation address.

Technical outcome of the present group of technologies resides in simplification of transfer of information on location of an arbitrary object in positioned at any arbitrary place and time due to the use of a unique navigational address, leading to a lower error count when transferring location coordinates, simplification of interaction between the service users and various services providers.

Figure 1:
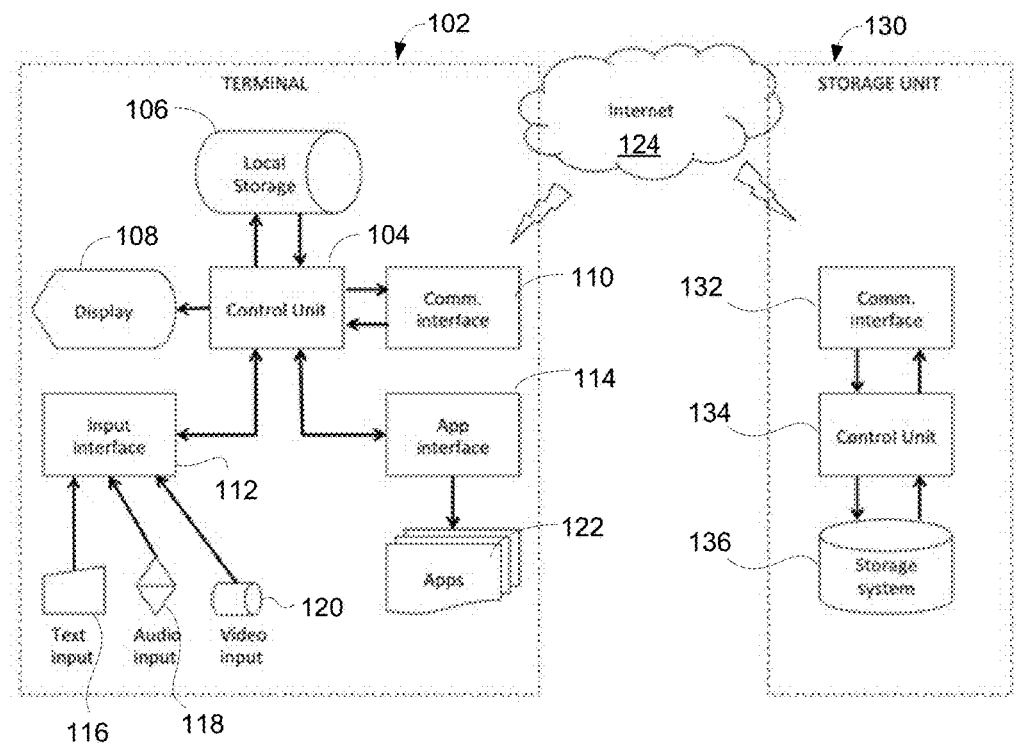
FIG. 1 is a block diagram illustrating aspects of a Naviaddress system as described herein.
Figure 2:
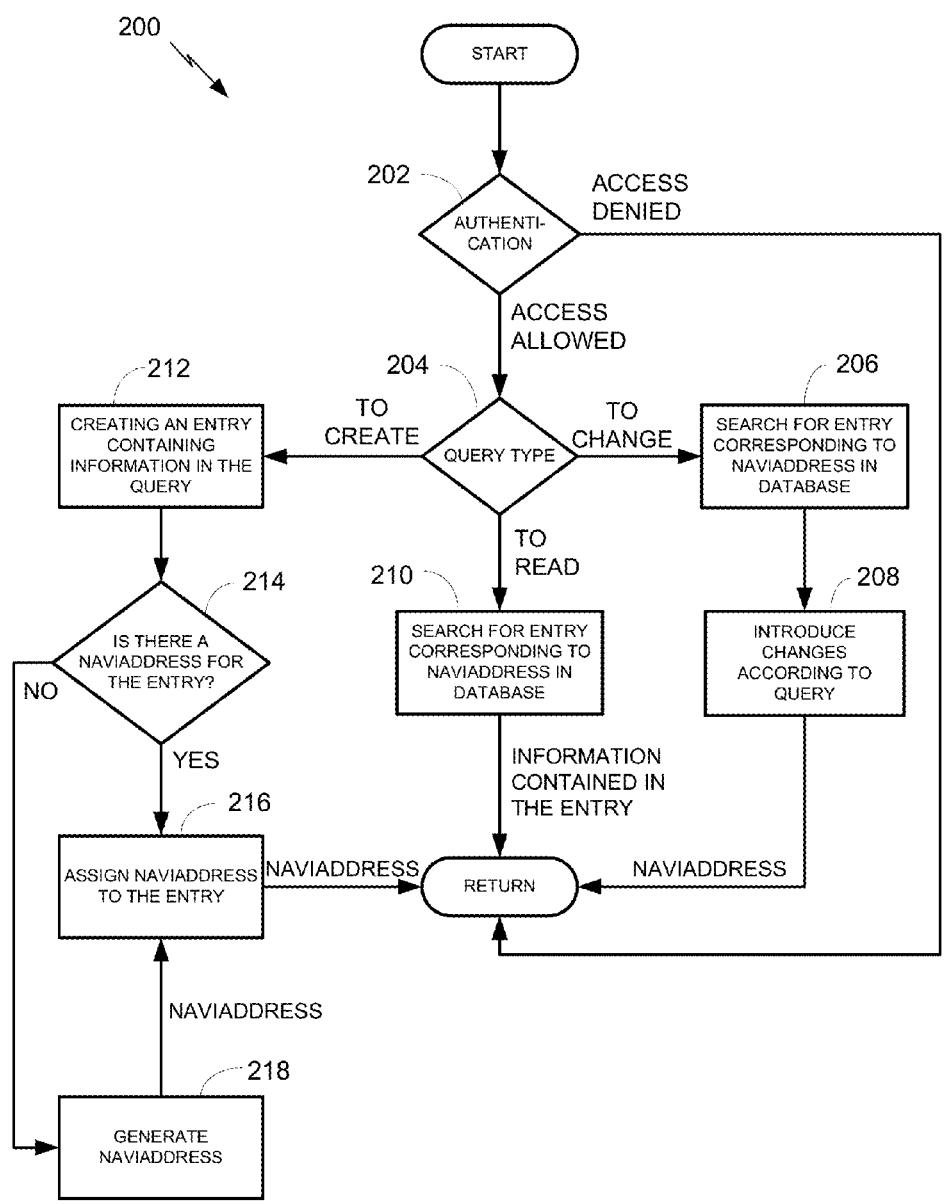
FIG. 2 is a flow diagram illustrating aspects of a Naviaddress method as described herein.

The technology is illustrated with explanatory drawings, where FIG. 1 shows a hardware system 100 for implementing the method of object location identification, and FIG. 2 shows aspect of a method 200 of a universal (Naviaddress) object location identification system.

Referring to FIG. 1, aspects of an object location identification system 100 are illustrated. The system 100 may include, for example, a unit to store information on a current location of an object being located by the system 100 (a storage unit 130) and a terminal 102, connected to it by communication channels, e.g., the Internet 124 and/or other communication network. The terminal 102 is implemented with a capability to make queries, to send queries to the storage unit 130, and to receive responses from the storage unit.

The storage unit 130 may include a subsystem to store information on the objects locations (a storage subsystem 136) and a subsystem, connected to it, to control the storage of information on the objects locations (a control subsystem or unit 134). The storage unit may sometimes be referred to herein as a "computer server," "server," "unit," "node," or similar terminology. The storage subsystem 136 may contain information on the objects locations arranged in the form of a database. The control subsystem 134 may be implemented with a capability to receive queries from the terminal 102 to the storage unit 130 via a communications interface component 132, and to send responses to the terminal 102, as well as to read and record the information in the storage subsystem 136 in accordance with the terminal queries.

The terminal 102 may be comprise a desktop computer or a portable computer, a portable electronic device, or another device enabling making queries and receiving information from the storage unit 130 via a communications interface 110. For example, the terminal 102 may comprise a smartphone, notepad computer, wrist-mounted computer, laptop computer, or other portable computing device including a communication interface 110 and display 108 or other user interface device. The terminal may further include an application software interface 114 using one or more applications 122. The terminal 102 may be implemented with a capability to enter the Naviaddress and/or the object location information in the form of a sequence of symbols and/or graphic images and/or signals of a different nature (sound, electromagnetic, etc.) via an input interface 112 in order to make a query to the storage unit 130. The input interface may be configured to receive text input 116 via a keyboard or touchscreen, audio input 118 via a microphone or other audio transducer, and video or other visual input 120 via a digital camera or the like.

The terminal may be connected to the storage unit by means of wire or wireless communication using the terminal software, for example, a web browser or another application via a communications interface 110 and Internet 124 or other network. The information received from the storage unit 130 may be displayed by the terminal using a display device 108, or may be transferred to another application and/or to another device by means of wire or wireless communication, for example, to implement the function of navigation and/or augmented reality.

The terminal 102 may comprise various components, for example, a processor or control unit 104 coupled to a memory or local storage 106. The local storage 106 may comprise a non-transitory computer-readable medium holding program instructions, that when executed by the control unit or processor 104, cause the terminal 102 to perform one or more operations of a method described herein, including but not limited to any one or more of the methods described in connection with FIG. 2, 4, or 10-15. It should be appreciated that other operations of these methods may be performed by the unit 130 or by a server in communication with the storage unit 130.

The storage unit 130 may be implemented on a terminal device and/or a remote server and/or a distributed (cloud) service. The storage subsystem may be implemented in the form of any information local storage media, or as a cloud information storage system, or as a combination of a local and remote storage media (for example, for temporary storage of information downloaded from a remote server). The control subsystem 134 may be implemented as software, hardware or a hardware and software suite, enabling reading and changing the information contained in the storage subsystem in accordance with the incoming queries. The control unit 132 may be coupled to a memory (not shown) including a non-transitory computer-readable medium holding program instructions, that when executed by the control unit 132, cause the storage unit 130 to perform one or more operations of a method described herein, for example, any one or more of the methods described in connection with FIG. 2, 4, or 10-15. It should be appreciated that other operations of these methods may be performed by the terminal 102.

A method of object location identification on a map and in space may be implemented by the system 100, for example, as follows. Information on the object location may be stored as a database entry, e.g., in storage system 136. This location information is put into correspondence (e.g., 1-to-1 correspondence) with a unique Naviaddress identifier, which may be expressed as a sequence of symbols represented using different means, including a standard alphabet, digits of different numerical systems, a graphical image (for example, a photograph, a fingerprint image, an iris or a retina image), or different encoding systems, for example, a barcode, a QR code, an RFID identification, a sequence of sounds, light or visual encoding. In certain embodiments, the Naviaddress consists entirely of, or essentially of, numeric digits. Storing of the location information and correspondence with the Naviaddress may be completed by the unity 130 in response to user input from the terminal 102. In an alternative, the unit 130 may store location, correspondence, and Naviaddress data automatically, without requiring any user input from the terminal 102. The object may be of any arbitrary nature capable of being located within a defined space, may be stationary or mobile, real or virtual, and may be of any size and location. Information on the object location may comprise geographic coordinates, altitude above sea level, mailing address, a time point, coordinates in any system of coordinates, as well as any extra information in the form of files, descriptive text, reference to other Naviaddresses, and other arbitrary information required for the use of the navigational address by the system 100 or by a human user thereof.

The Naviaddress identifier corresponding to the object location may be transferred to a user, and such transfer may be carried out in different modes. For example, the storage unit 130 may send the Naviaddress identifier to the terminal 102 by e-mail, by an SMS message, by generating paper output for mailing by post, by publishing in a publicly available medium (for example, TV channel, billboard, website, mark on map, etc.), by including as identification for geotags for photo and video materials, or any other available methods. Entities providing services or goods to a user may also become Naviaddress recipients. Such entities may include, for example, courier and post services, taxi companies and taxi traffic services, commercial companies, emergency services, security services, rescue services, and utility service providers.

Aspects of a method performed by a system 100 may include operations performed by a user terminal 102 or storage unit 130. For example, referring to FIG. 2, a method 200 for obtaining a Naviaddress by a terminal 102 may include various operations generally directed towards querying the storage unit 130 and other operations, based on user input to the terminal 102. The query may be generated on the initiative of the user, or automatically, and may contain the Naviaddress and/or information on the object location. Then the query is transmitted to the storage unit 130 and received by the control subsystem 134 via the interface 132. To receive the location information, a user, who has received a Naviaddress through some other channel or through the terminal 102, accesses the database via the terminal 102. To secure access to the database, the terminal 102 may require the user to pass a user authentication procedure 202. Based on the results of the user authentication procedure 202, the user may be granted with access to different query types 204, for example, via a menu or other suitable user interface. Different query types may include, for example: for creating a new Naviaddress and its correspondence to an object that lacks such an address, for reading an existing Naviaddress (including partial reading of entries) that uniquely corresponds to an object to be located, and/or for changing location or object information that is associated with an existing Naviaddress (including creating new information entries and deleting the existing ones).

To execute a query type "to read," the user enters the Naviaddress into the terminal unity 102. Upon receiving the Naviaddress in a context indicating a "read" request, the terminal sends a query to the storage system 130. In response to receiving the query, the storage system 130 searches 210 for an entry corresponding to the Naviaddress in its database. Upon retrieving the location information corresponding to the Naviaddress, and the storage unit 130 returns the corresponding information on the object location from the database as a response to the user terminal 102, which outputs the information via a user output device (e.g., display 108). The search string for the query may consist of the Naviaddress only, which the control subsystem 134 may use to identify the corresponding entry in the database of the storage system. Once the corresponding entry is found, the control subsystem generates a response containing the information on the entry found and sends this response to the terminal. If the database does not contain an entry corresponding to the Naviaddress used in the query, the control subsystem 134 generates a response containing a message that the entry being searched is not found and sends it to the terminal.

In an aspect of query response generally, before sending a response to the terminal, the control subsystem 134 may check a privacy setting associated with the Naviaddress or corresponding location information. The control subsystem 134 may limit distribution of the location information, based on the privacy setting. For example, the privacy setting may indicate that the information is authorized for access by all users, by a designated Naviaddress "owner" only, or by a limited group of users (e.g., family members). The control subsystem then responds to the terminal 102 based on the privacy setting, for example, returning an error message without the location information if the privacy setting indicates that the terminal is not authorized, or returning the location information if the privacy setting indicates that the terminal is authorized to receive the information.

To execute a query type "to create," the user enters location information 212 into the terminal unity 102. For example, a user may pick an address location shown in an interface of a mapping program operating on the terminal, and a terminal application for the Naviaddress function may obtain the address or other location entry from the mapping application. Upon receiving the location entry in a context indicating a "create" request, the terminal sends a query to the storage system 130. In response to receiving the query, if the database does not contain a Naviaddress corresponding to the location entry used in the query, the control subsystem 134 generates 218 a new Naviaddress using one or more algorithms as described herein below, associates the newly created Naviaddress with the location entry in the database. For example, the control subsystem creates an entry in the database of the storage system and associates a unique Naviaddress with it. If the database does contain a Naviaddress corresponding to the location entry used in the query, the control subsystem 134 provides (assigns) 216 the existing Naviaddress for the location entry in response to the location query. Once a new Naviaddress is generated or an existing Naviaddress retrieved, then the control system generates a response containing the Naviaddress of the generated entry and sends it to the terminal. After receiving the response to the query, the terminal either displays the information contained in the response, or sends this information to another application and/or device.

To execute a query type "to change," the user enters a Naviaddress into the terminal unity 102 with location information that it is desired to update. Upon receiving the Naviaddress in a context indicating a "change" request, the terminal 102 sends a query to the storage system 130. In response to receiving the query, the storage system 130 searches 206 for an entry corresponding to the Naviaddress in its database. Upon retrieving the location information corresponding to the Naviaddress, and the storage unit 130 returns the corresponding information on the object location from the database as a response to the user terminal 102, which outputs the information via a user output device (e.g., display 108). The control subsystem 134 may compare the location information received via the query and introduces 208 any changes into the database according to the query. Optionally, the control subsystem may create additional records to maintain a record of the prior location data associated with the Naviaddress provided in the change query, for historical, recovery, or audit purposes. The control subsystem 134 generates a response containing a message that the location entry for the Naviaddress has been changed, and sends the message to the terminal.

Figure 3:
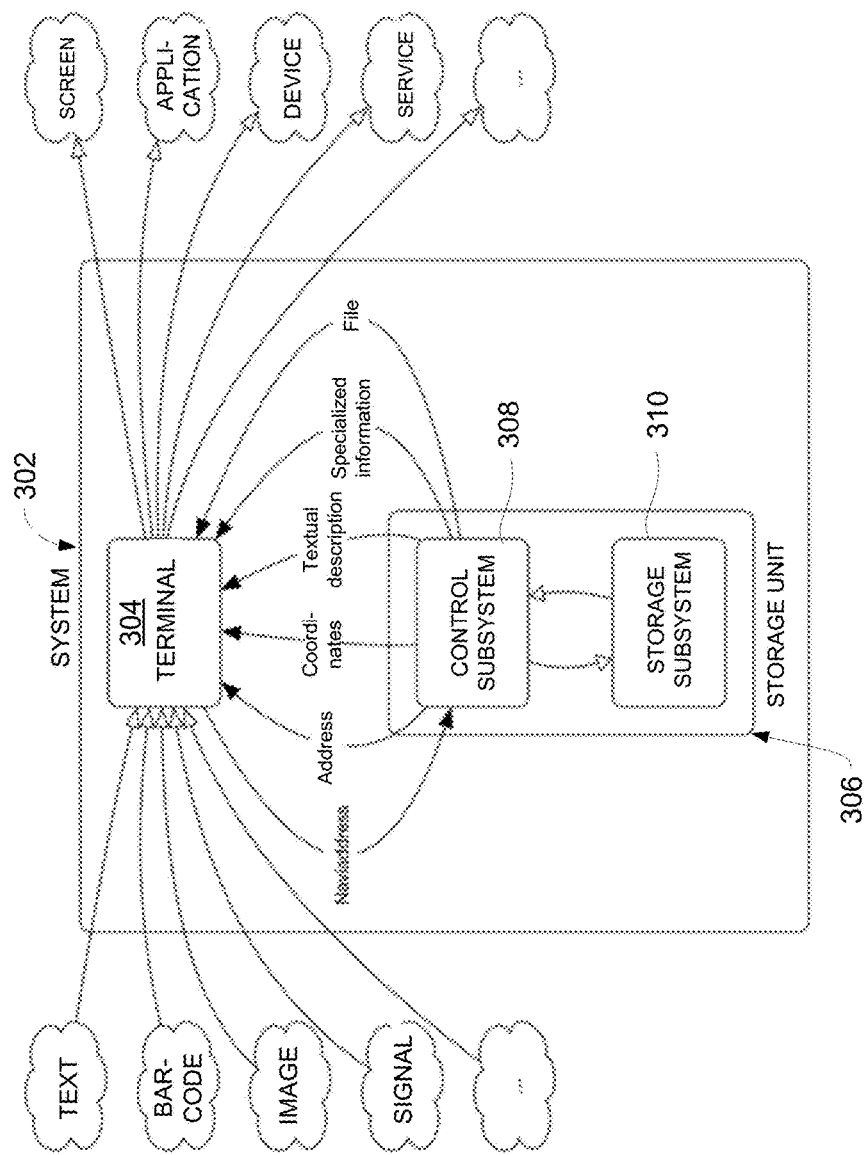
FIG. 3 is a block diagram illustrating additional aspects of a Naviaddress system as described herein.

FIG. 3 shows an alternative view 300 of a system 302 for object location identification, which may also contain components as illustrated in system 100, illustrating data flows between different components. The terminal 304 (102) may receive Naviaddress data in any suitable form, for example as text, barcode, image (e.g., from a camera component or any other source), or coded signal. The terminal 302 provides the Naviaddress to the storage unit 306 (130) via the control subsystem 308 (134) which is in communication with the storage subsystem 310 (136). For illustrative simplicity, the communication unit 132 is not shown in FIG. 3. The storage unit 306 can provide, in response to a Naviaddress from the terminal 304, data including a postal address, geographic coordinates, a textual description, specialized information, and any associated files such as (for example) image or video files. The terminal 304 may output the receive data to a display screen, other application (for example, a mapping application), another device, a remote or local service, or other data sink. For example, the location information received may be used by the user himself/herself, or may be transferred to the application or to a device for further processing, usage and provision of data to the user (for example, to navigator software, to a portable electronic device, or to devices implementing augmented reality functions, etc.).

In order to keep Naviaddress assignment logical and easy to remember a hierarchical approach may be used. Each object usually belongs to some group of closely located objects, e.g. building is a part of a block, block is a part of a city, city is a part of a region continent etc. One can think in terms "container in a container" analogy. In the example above a city is a container, which comprises a number of smaller containers, blocks, while each block is a container itself, which contains buildings etc. In order to specify an object location one can specify the outer container first, and then specify a smaller container inside it, and so on, and finally specify the object location inside the smallest container.

Naviaddress for an object may be configured as a sequence of local addresses of containers inside the bigger containers.

For example, Naviaddress for any room in a building on the Earth may have the following structure (wherein the depicted numeric values are arbitrary examples):

| Country | City | Building | Apt./Level | Room |
|---------|------|----------|------------|------|
| 007     | 495  | 236104   | 59         | 3    |

The Naviaddress may use an alternative structure by assigning premium numbers on top of regular Naviaddress structure or as a replacement. In the example above, the building number inside a city could be any six-digit number. For convenience to end users the assigned number may use digits, which appear in the postal address of that building.

Figure 4A:
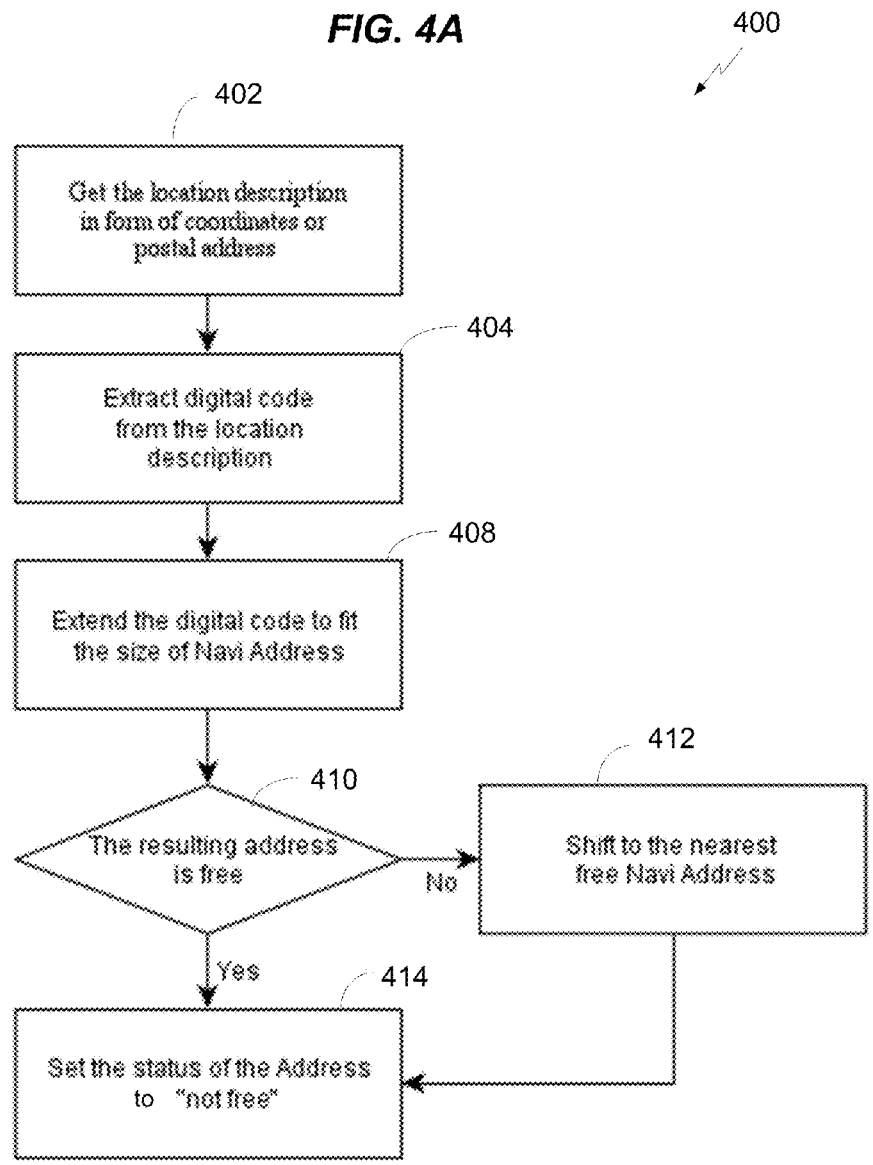
FIG. 4A is a flow diagram illustrating additional aspects of a Naviaddress method as described herein.

For further example, referring to FIG. 4A, a process 400 for generating a Naviaddress may be implemented as a process executed by a computer server, by obtaining or receiving 402 location data in the form of geographic coordinates or a postal address including a numeric portion (for example, street address number or postal code). A Naviaddress generation algorithm used in the process 400 and may include, for example, the following steps:

Step 1 (Block 404): Extract digital part from the street address by removing all symbols, which are not digits.

Step 2 (Block 408): Extend or crop the resulting sequence of digits to fit the standard length of Naviaddress, while maintaining a minimal Levenshtein distance between the original street address and obtained string of digits. To one of ordinary skill in information theory and computer science, the Levenshtein distance refers to a metric measuring a difference between two string sequences. The Levenshtein distance between two character strings may, for example, correspond to a minimum number of single-character edits (i.e. insertions, deletions, additions or substitutions) required to change one character string into another.

For more specific example, an algorithm generating a Naviaddress from an input postal address and phone number may include extracting the leading numbers include the country code and area code from the phone number. Then, extracting the one or more digits of a number from a street address, e.g. street number. Then, extracting one or more digits of another number from postal address, e.g. apartment number or floor number. Then, combining the extracted numbers in a predetermined sequence. This process may be designed to generate the Naviaddress having a minimal Levenshtein distance from the street address and phone number.

Step 3 (Block 410): Check if the obtained number is free in Naviaddress database, otherwise shift to the nearest free Naviaddress number.

If there is need to assign Naviaddress to the object which is part of another object with already assigned Naviaddress, the system may enable one to add additional digits to the assigned Naviaddress (Block 412). The number of digits added may depend on the number of the objects within another object with assigned Naviaddress. Such Naviaddress assignment approach could be used to assign Naviaddresses to the individual stores within shopping mall, or to the individual seats in a stadium. For further example, for offices and apartments the generation algorithm may use the floor number and the office number to minimize the Levenshtein distance. Once a novel Naviaddress is generated for the location data, the control subsystem may set the status of the new Naviaddress to "not free" meaning already in use, in a register or other suitable data structure (Block 414).

FIG. 4B illustrates aspects of converting 450 a street address 452 to a Naviaddress 461 using a process 400, and then creating 470 a Uniform Resource Locator (URL) 474 based on the resulting Naviaddress 461 for a web page 476 containing information about the location represented by the Naviaddress 461. A street address 452 will typically include at least a locality indicator 458 and a building indicator 456. Optionally, it may include a building subdivision indicator 454. An example of a locality indicator is a city-state-country set, for example "San Francisco, Calif." Large cities may include one or more telephone area codes within their borders. Therefore, the locality for an address located in a large city may be uniquely identified by 'n' numerical digits, wherein 'n' may be as few as 4 digits: 1 to 3 digits for a telephone country code, and 3 digits for the area code. For example, a locality within San Francisco may be represented by "1415." Localities with smaller towns or in rural areas may or may not require an additional digit to distinguish between identical building indicators 456 (e.g., street addresses). For example, it is possible that two towns within the same telephone area code both use the street address "123 Main Street." An additional digit may be used to distinguish between towns in the same area code, for example using one of the identification digits 466. For navigation within the same locality, the locality information is not needed. If not supplied by the user, it may be assumed that the user is searching for an address with the locality where the user is presently located, or that the user has otherwise specified.

Figure 4C:
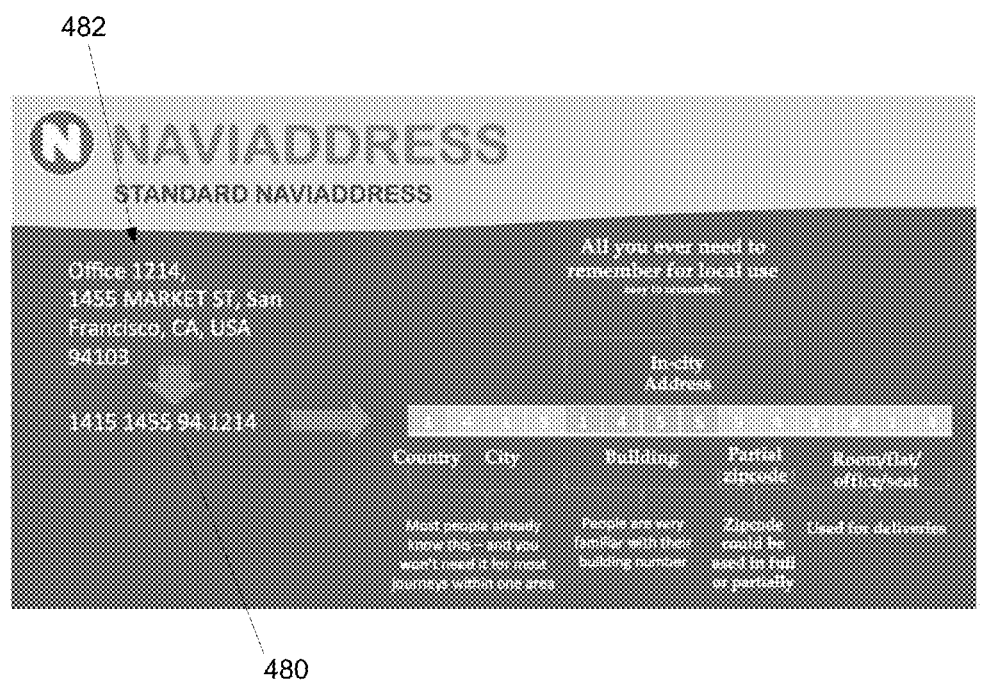
FIG. 4C is a diagram illustrating aspects of a Naviaddress converted from a street address.

FIG. 4C illustrates further aspects of a Naviaddress 480 converted from a street address 482. Qualitative aspects of the country, city, building, partial zipcode and building subdivision are described to the right of the example Naviaddress 480.

The building indicator 456 in a street address 452 is typically a street address (e.g., 123 Main Street) or may be a street address plus a building number if multiple buildings are located at the same address. Using the process 400 as described above, the building number may be converted to a numeric identifier 'm' digits long, where 'm' is four or more, plus a general identifier 466 that is 'p' digits long, wherein 'p' is two or more. In most urban localities, a building identifier four digits long plus a general identifier two digits long should suffice to uniquely identify every street address within the locality. Therefore, a user will be able to specify any address in the locality using a Naviaddress portion consisting of the building and general identifiers 464, 466 that is only six digits long. This will be easy to remember, and in most cases the first four digits of the street address will match the first four digits of the Naviaddress portion. If the n-digit locality number 462 is added, the full address can be indicated by ten or more digits.

If it is desired to specify a unit within the building (e.g., for delivering a package), the address subdivision 454 (e.g., room number, office number, seat number) may be converted by the process 400 to an numeric identifier 'q' digits long, wherein 'q' is four or more digits. Context can be used to distinguish the semantic meaning of any given Naviaddress. For example, a ten-digit number might indicate an address plus subdivision (blocks 464, 466, 468) or a locality plus address (blocks 462, 464, 466). In any given user interface therefore, when a ten-digit number is received, the appropriate context should be clarified in any suitable manner. It should be appreciated that a Naviaddress may be considerably shorter than ten digits; for example, a shortened (e.g., 3, 4 or 5 digit) temporary or permanent pin number may be used to indicate non-street addresses in a locality. For further example, a "premium" shortened number (e.g., 3 digit) may be available for purchase from a system operator, to designate any desired street address or other addressable geographic location.

The resulting Naviaddress 461 can be used in an automatic process 470 to generate a web page 476 and associated Uniform Resource Locator (URL) 474. The web page may be generated using a template that is populated by the process 470 using location data generally available for the specified location (e.g., street address, map location, business information) plus any user supplied data. The resulting network asset 472 relates the numerical-only Naviaddress 461 to the street address and/or other information that describes the location for which the Naviaddress was generated. These web pages may be saved in a manner that can be indexed by search engines. As a result, a user that enters a Naviaddress into a search engine may receive, for example, a postal address, coordinates and location. And if it's a map search (for example, Google™ maps, Yandex™ maps) the user may receive the location on the map. When search engines integrate Naviaddress database through a provided API it may become even simpler for the clients to use the Naviaddress to locate associate web assets.

Further examples of different Naviaddress addresses of different object types are provided below. Depending on the type of and properties of object, being identified by Naviaddress, the following Naviaddress types may be distinguished:

Naviaddress Type 1: Objects that have a street (mailing) address;

Naviaddress Type 2: Objects that do not have a street address (for example, stands, monuments, park benches, and other places of interest);

Naviaddress Type 3: Objects that, apart from the address, can be identified by altitude or depth (for example, a rooftop sightseeing platform or a basement restaurant);

Naviaddress Type 4: Moving inanimate objects (for example, cars, aircrafts, ships and boats, other moving objects), as well as living beings (for example, human beings and animals), as well as gadgets;

Naviaddress Type 5: Celestial bodies (for example, comets, planets, stars, etc.) within the system of coordinates recognized in this field;

Naviaddress Type 6: Objects of the microworld (for example, molecules, atoms, sites of the lattice);

Naviaddress Type 7: A virtual object in a real world, as in case of augmented reality (for example, a virtual house on a real island);

Naviaddress Type 8: A virtual object in a virtual world (for example, a virtual house on a virtual island).

At the same time, the Naviaddress Type 1-3 locations may also comprise, apart from the mailing address, the geographic coordinates, which the user can identify using, for example, GPS, GLONASS, A-GPS systems, as well as other methods, for example, the ones based on the use of fixed cellular base stations with known location.

The Naviaddress Type 4-5 locations may also comprise a field specifying the speed of the object movement, as well as the direction of movement, and a field specifying the time point when the object was located in these coordinates. The Naviaddress Type 7 may be used, for example, to identify an object, which does not exist in this place, or was located in these coordinates in the past, or will be located there in the future. The Naviaddress Type 8 may be used to identify virtual objects existing in virtual environment of certain computer software (for example, a computer game).

The Naviaddress Type 6 may be used to solve specific tasks associated with identification of location of a certain object in a certain system of coordinates known to a user (for example, location of a certain organ or its part in the body; location of a certain atom in a complicated molecule or another structure). Entries of all types may also comprise fields containing information on the target application (for example, for entries of Naviaddress Type 6-8, on the software used for visualization and operation with virtual objects).

The number of fields in one entry, as well as types of data in them, may vary depending on the Naviaddress Type. Besides, a user may add extra fields himself/herself and define the type of data in them.

The use of the Naviaddress may be illustrated with some examples of different use cases. It should be apparent that the use of the universal navigational address, the Naviaddress, may be extended beyond the below examples, and these examples are provided solely to illustrate how the method and the system may operate in various different circumstances and for different uses.

Calling a Taxi Service:

A user accesses the Naviaddress Service via a web browser or a specialized application on a computer connected to the Internet network, and creates a Naviaddress Type 1 entry containing, for example, his/her home address. The user puts an easy to remember sequence of symbols (for example, "Home Sergey") into correspondence with the unique Naviaddress. Then, when the user wants to call a taxi to his/her place, he/she sends the Naviaddress to the taxi company using any communication means. Based on the received Naviaddress, the taxi company makes a query using a computer to the Naviaddress Service and receives information on the customer's location. Based on the data received, the application identifies the vacant car closest to this location and sends the location data to it. As a result, the use of the Naviaddress minimizes the taxi calling time, as well as reduces considerably the probability of mistakes when communicating the exact address.

Delivering Goods by Drone:

Similarly, the Naviaddress may be used to order and deliver goods, specifically, by unmanned aircrafts—drones. In this case the Naviaddress is given not to the customer's mailing address, but to geographic coordinates of the exact place where a drone can safely land to deliver the goods.

An organization in charge of park improvement, when putting park benches, may assign Naviaddresses of Naviaddress Type 2 to them. When creating an entry in the Naviaddress Service database, accurate geographic coordinates of every bench are specified. The corresponding Naviaddress may be specified on the park map, as well as it may be printed on the bench as a sequence of symbols in a place accessible for reading.

A user sitting on the bench identifies the Naviaddress of this bench on the map (or reads it from the bench itself) and sends it as an SMS message to another user inviting him/her to come. The invited user, who received the SMS message, enters the Naviaddress into the application on his/her smartphone. The application contacts the storage unit and receives information on the exact location of the bench, which then is transferred to the navigator application of the invited user's smartphone. Using the navigator the invited user easily finds the bench.

Thus, the location information is transferred quickly, without any mistakes or discrepancies.

Guiding Users to Retail Establishments:

A shop owner creates a Naviaddress Type 3 entry in the storage unit, using the Naviaddress service, this entry contains the address, geographic coordinates of the shop and information on its location, for example, street address or location inside a shopping and entertainment mall. The shop owner may put this Naviaddress received as a QR code on a billboard advertising his/her shop or on an advertising banner on the Internet.

A user reads the QR code on a billboard and sends the Naviaddress to the Naviaddress Service. The Naviaddress Service provides the user with information on the location. Apart from the geographic coordinates and mailing address, this information contains data on the exact location of the shop in the big shopping and entertainment mall (a wing, a floor, etc.). The application that received this location information transfers the geographic coordinates (and address) to the navigator application, which in its turn constructs a path to the shop. Besides, the received information may be transferred to portable electronic devices (smart glasses, smart watches, etc.), which facilitate navigation both to the shopping mall, and inside it, using the augmented reality means.

Tracking of a Shipping Vessel:

Naviaddress Type 4 may be assigned to every vessel (e.g., container ship, railcar, or semi-trailer). The terminal installed on the vessel has an application that automatically receives the location information (geographic coordinates). The application automatically sends queries to the storage unit updating the information contained in the entry corresponding to the vessel's Naviaddress.

When the vessel's Naviaddress in entered, the application on the user terminal receives information from the storage unit, and the terminal displays the location of the vessel on the map and information on its speed of movement.

In this case, the so called "bound" navigational addresses may be used as well. The Naviaddress of one object (for example, of a container) has a reference to the Naviaddress of another object (for example, of a container truck), in which this container is located at the moment. Such binding of navigational addresses may have many levels. For example, goods→container→container truck.

Identification and Tracking of Celestial Bodies:

An observatory may assign a Naviaddress Type 5 to a celestial body (e.g., a comet) specifying its location in celestial coordinates, its speed and direction of movement, as well as points of time in UTC, when such data was relevant. The Naviaddress assigned to the comet is then put into the publicly available reference book.

The Naviaddress assigned to the comet is also sent to the network of observatories tracking the comet, with a right to change the information on the location, corresponding to the Naviaddress of the comet, in order to keep the information on the comet up-to-date. All other users have a right to read the corresponding information only.

An astronomer wishing to see the comet finds its Naviaddress in the reference book and enters it into the terminal, which sends a query to the storage unit. Response to the query contains the current information on the comet location, its speed and direction of movement, as well as the point of time when such data was relevant.

After receiving the response to the query, the terminal activates the application, which displays the information received, as well as marks the comet location on the celestial map.

Design of a Building in a City:

An architect creates a 3D model of a building in a specialized application and saves this model as a file of a corresponding format. Then, the architect accesses the Naviaddress Service via his/her web browser and creates a Naviaddress Type 6 entry with a unique Naviaddress, which contains information on the building location and the file with the 3D model of the building. The corresponding Naviaddress is transferred to a user.

The user, who received this Naviaddress, enters it into a specialized application of his/her mobile device (a smartphone, a tablet, etc.). The application sends a query containing the Naviaddress to the storage unit. The information contained in the storage unit response is received and processed by the application enabling to see the building designed in a real place in the city using the augmented reality means (in a real-time environment overlaying the image of the building on the image from the mobile device camera with account to the location of the mobile device, and displaying the picture on the screen of the mobile device).

Location in a Computer Game Environment:

A developer adds the Naviaddress Service terminal functionality to the game (e.g., "World of Tanks"). A user selects a meeting point on the map or in the computer game environment and marks it activating the corresponding graphic interface elements. An entry is generated in the storage unit; this entry contains information on the coordinates of this meeting point. A Naviaddress is generated automatically (or is chosen by the user), and is displayed on the user screen.

In order to organize a meeting of users in this place within the computer game environment, the user sends the Naviaddress to the invited users. The invited users enter the Naviaddress received into the corresponding element of the graphic interface and a marker appears on the virtual map, which allows them to quickly and definitely find the meeting point.

Application in Medicine:

A developer creates an application with a 3D detailed atlas of human anatomy and a system of coordinates, as well as the Naviaddress Service terminal functionality. When a doctor finds pathology in a patient, he/she creates an entry with a unique Naviaddress containing the coordinates of the pathology and its type.

In order to discuss the issue with a colleague, the doctor sends him/her the Naviaddress. The doctor, who received the Naviaddress, enters it into the application with the 3D detailed atlas. The application sends a query containing the Naviaddress entered, and receives information on the pathology in response. Upon the receipt of the Naviaddress Service response, the application implements the graphic representation of the pathology according to the anatomic location.

Navigation "NaviPath" Application:

In order to find directions in a city a user can use interface illustrated on the figure, which allows using Naviaddress to specify the start and/or the end of the journey.

The application operating on a user terminal calls the Navi database to resolve the Naviaddress, and then invokes Google Maps API or a similar service to retrieve and visualize the resulting path. That interface would be particularly for tourists in foreign countries, which alphabet or syntax is not common for the application user (e.g. tourist whose native language is based on Latin or Slavic visiting China, Japan, or vice versa). FIGS. 5-9 illustrate various aspects of a user interface for a "NaviPath" or similar application.

Figure 5:
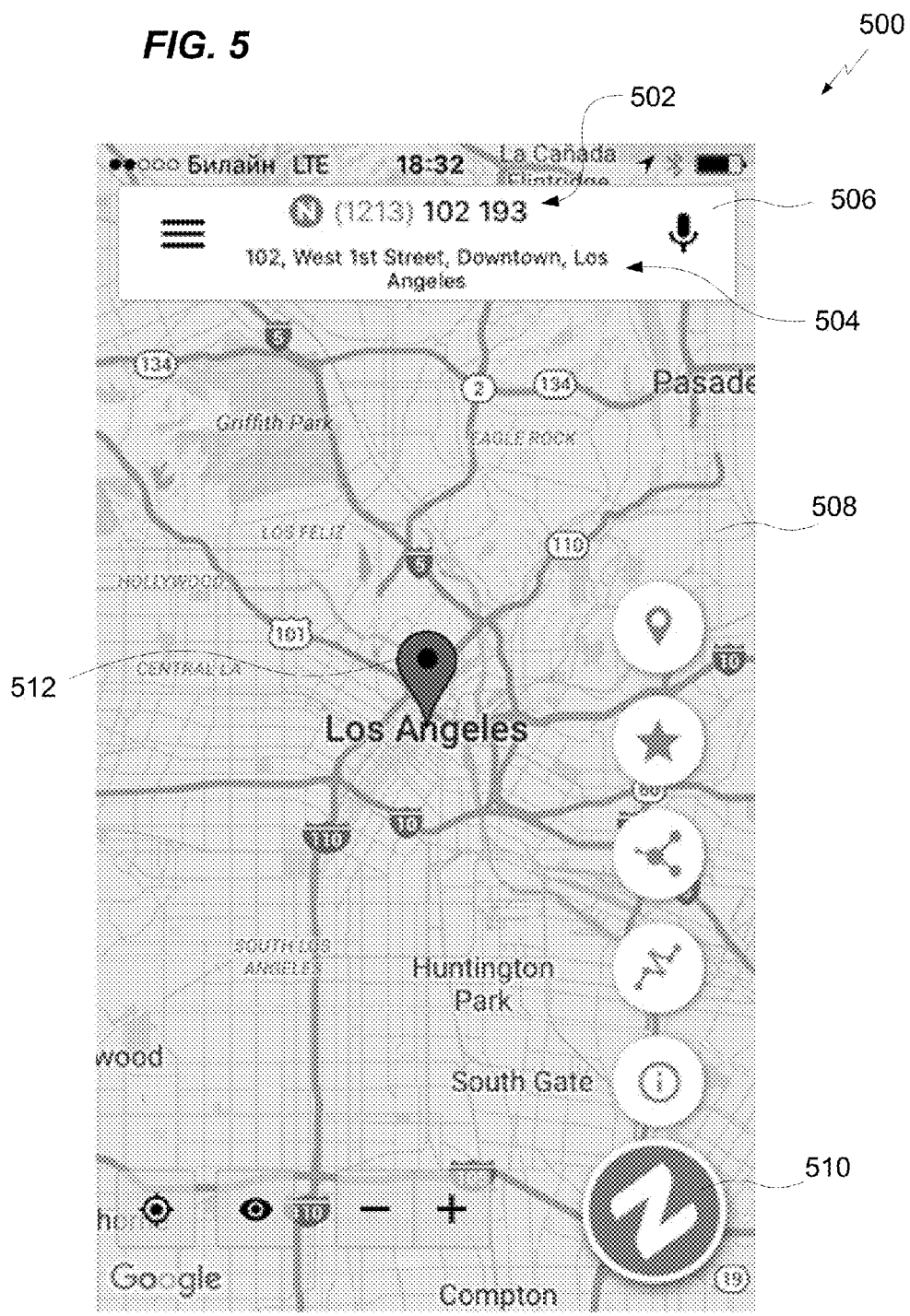

FIG. 5 shows a screenshot 500 as may be displayed, for example, by a graphical user interface (GUI) of a mobile user terminal, for example, a smartphone or notepad computer. The GUI may include, in an upper window 506 the regular street address 504 and the corresponding Naviaddress 502, which has been composed from country code, area (or city) code, relevant number from street address to minimize Levenshtein distance between the street address 512 and Naviaddress. Other features of the GUI may include, for example, a pin icon 512 indicating a location of the address 504 within a geographic map display 508. The GUI may include various icons including an interactive Naviaddress icon 510 that can be used to call an embedded application that provides Naviaddress functions in conjunctions with cooperating modules or applications, for example, a mapping application and wireless communication application operating on the user terminal.

Figure 6:
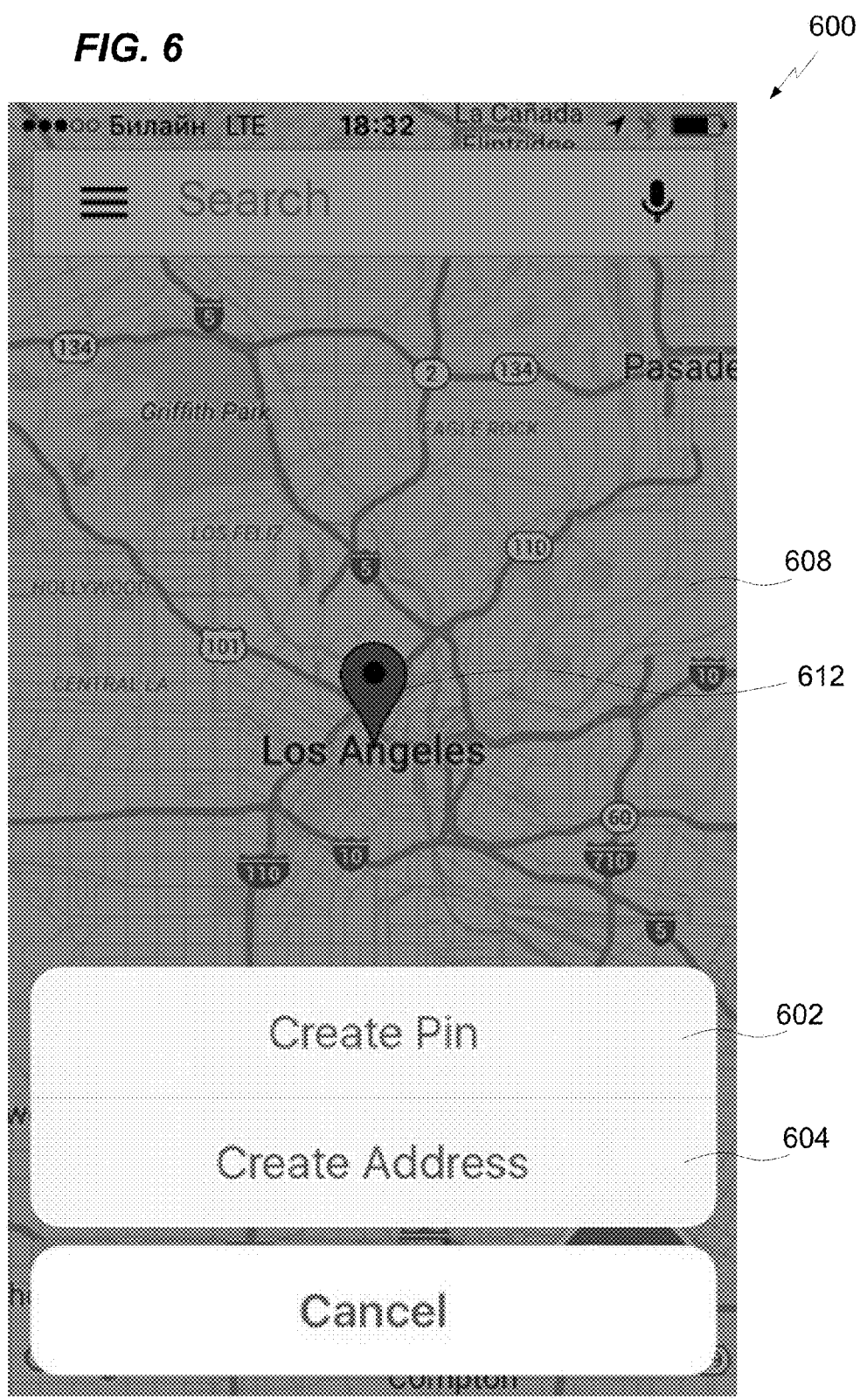

FIG. 6 shows another screenshot 600 of the GUI during a different application state, illustrating further aspects. The GUI may be controlled to appear as shown in screenshot 600 in response to a user selection of the pin icon 512 shown screenshot 500. In response to the user selection, the Naviaddress function may activates a menu comprising options 602, 604. A first option 602 may enable the user to command the user terminal to create short address (also referred to herein as a "Navipin") for the object pointed by the pin icon 612 in the map 608. A second option 604 may enable the user to command the user terminal to create a regular Naviaddress with additional comments.

FIG. 7 shows another screenshot 700 of the GUI during a different application state, illustrating further aspects enabling a user to obtain a new Navipin 704 for an indicated address 702. The short Naviaddress 704 (in this case "9177") enables the address object 702 to be uniquely labeled within the context of a particular country and area code (in the illustrated case, "1213"). with just four numeric digits. The GUI may display additional fields 706, 708 configured for enabling the user to define additional information for a control subsystem to associate with the created Navipin 704, for example, an Address name field 706, and comments in a specific details field 708.

Figure 8:
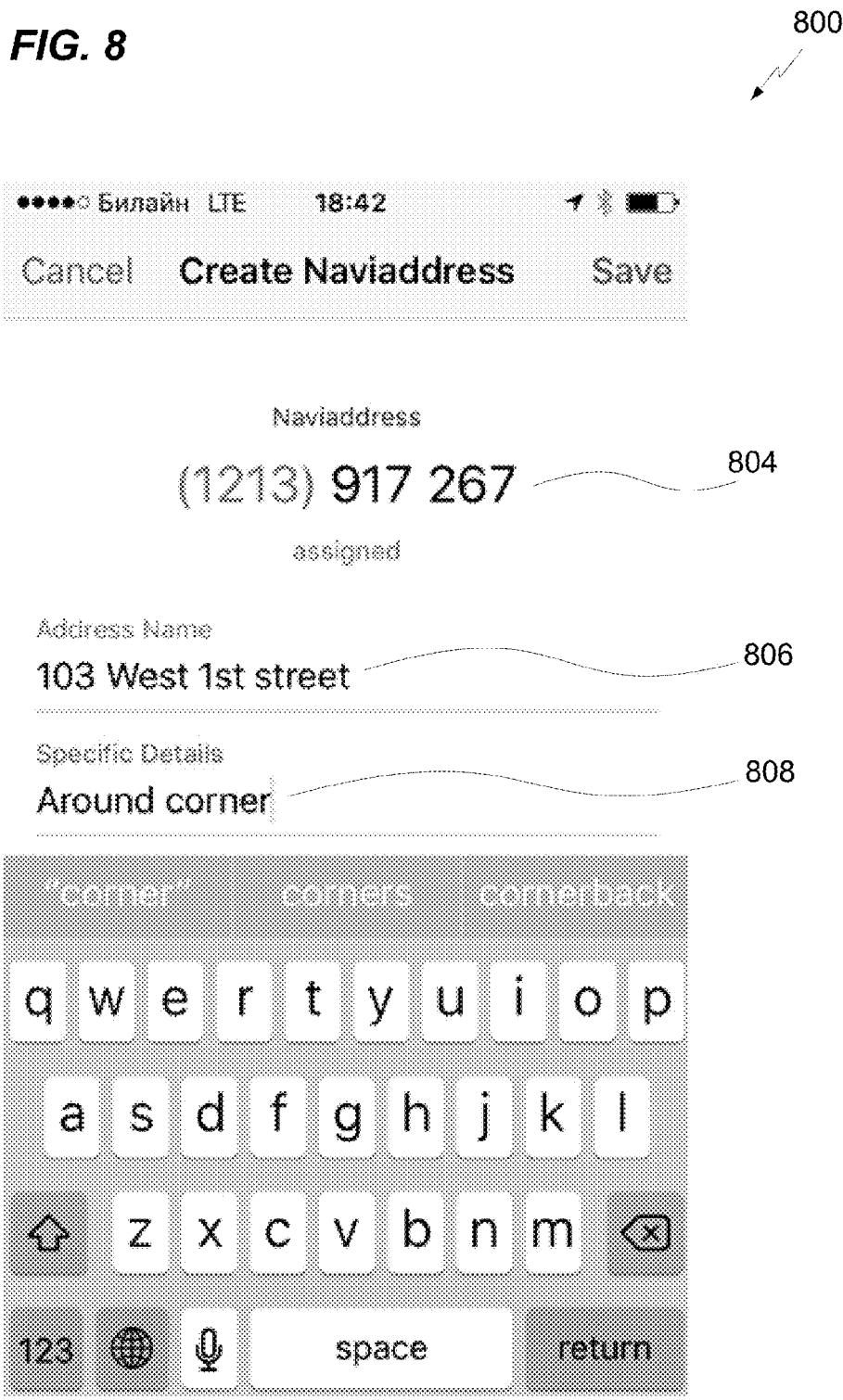

FIG. 8 shows another screenshot 800 of the GUI during a different application state, illustrating further aspects for enabling a user to create a custom Naviaddress 804, instead of, or to replace a Naviaddress automatically generated by an algorithm. The GUI may include additional fields 806, 808 enabling the user to define additional information for a control subsystem to associate with the custom Navipin 804, for example, an address name field 806, and comments in a specific details field 808.

Figure 9:
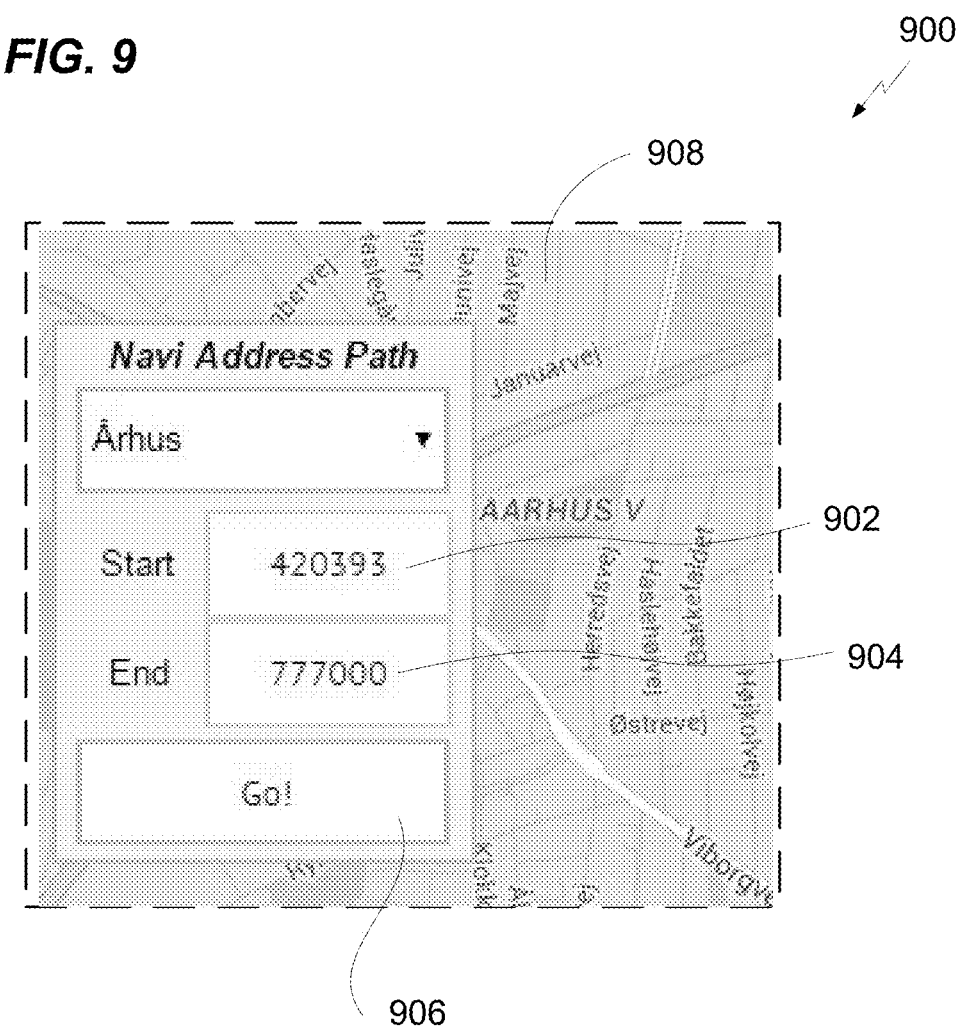

FIG. 9 shows a screenshot portion 900 of the GUI during a different application state, illustrating further aspects. Here, the Naviaddress application is generating a menu floating over an underlying map 908. The menu enables a user to specify a path for navigating between two physical addresses, by providing numeric-only Naviaddresses 902, 904. Once provided, the user may select the "Go!" icon 906 to initiate a navigation process. In the navigation process, the user terminal may retrieve "start" and "end" geographic locations corresponding to the supplied start Naviaddress 902 and end Naviaddress 904, respectively, using a process as described herein above. The geographic locations thus retrieved may then be provided to a conventional navigational application or module for navigational output.

Figure 10:
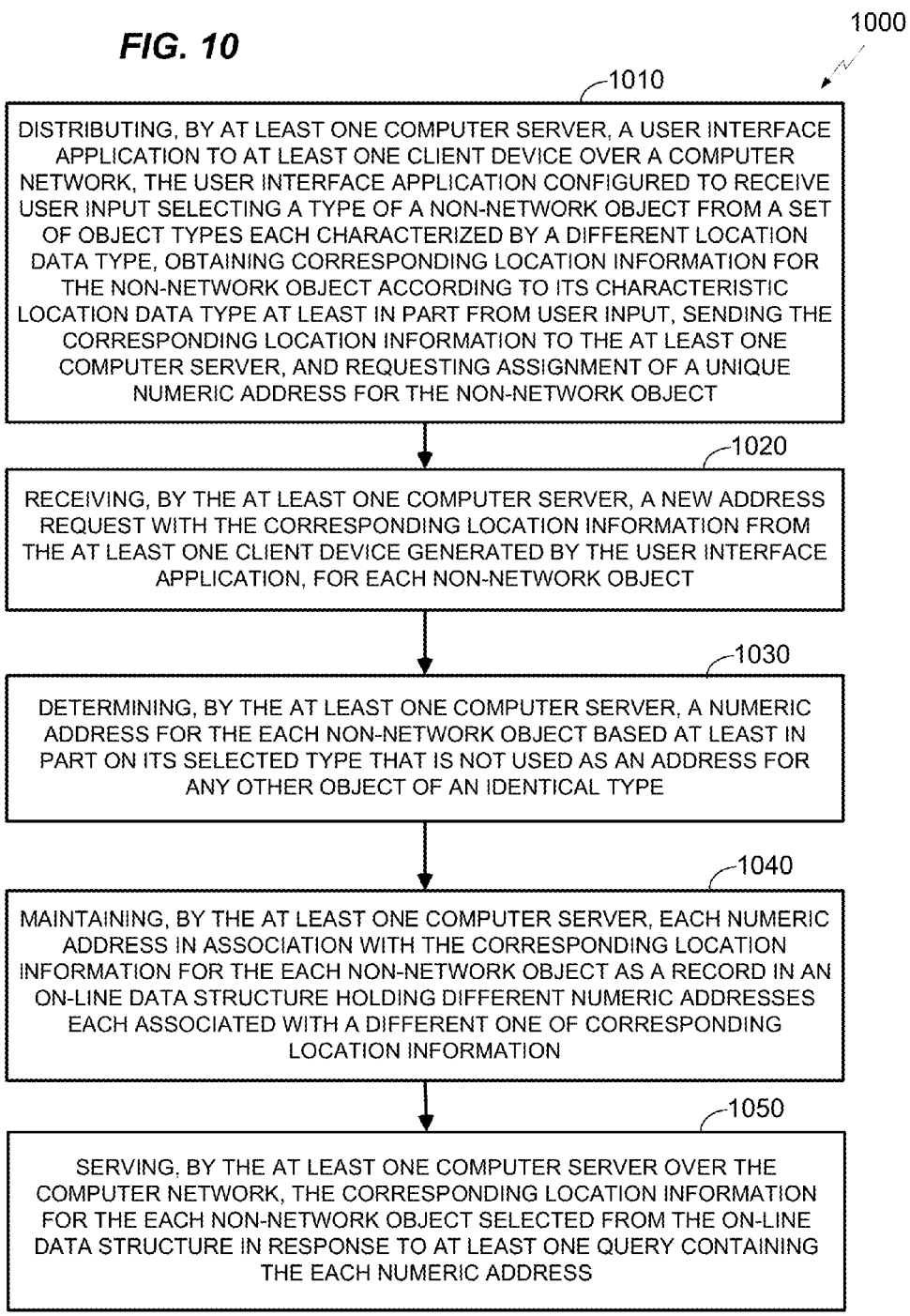

In view the foregoing, and by way of additional example, FIGS. 10-15 show aspects of a method 1000 or methods for providing and managing a Naviaddress, as may be performed by a system including at least a user terminal and storage unit as described herein. Referring to FIG. 10, the method 1000 may include, at 1010, by a processor, distributing, by at least one computer server, a user interface application to at least one client device over a computer network. For example, the application may be transmitted from a server to the client device as a file over the Internet, or over a combination of the Internet and a wireless telephone network. The user interface application may be configured to receive user input via the client device, for example, from a touchscreen that presents a graphical user interface and receives touch input selecting a type of a non-network object from a set of object types each characterized by a different location data type. The user interface application may further be configured for obtaining corresponding location information for the non-network object according to its characteristic location data type at least in part from user input. For example, the user interface application may include instructions for causing the recipient client device to present one or more user interface screens via which a user of the device may enter the location information, such as, for example, a postal address for a postal-addressed location type, longitude and latitude coordinates for a geographic location type, and so forth. The user interface application may further be configured for sending the corresponding location information to the at least one computer server, for example, by generating a message including the information and transmitting it via the computer network to a designated server address for receiving new location data. The user interface application may further be configured for requesting assignment of a unique numeric address for the non-network object. For example the transmission of the new location information in a message may automatically be construed as a request, or in the alternative, the client device may generate a separate request message or include separate request data in the location message. The object types may all be non-network objects, meaning objects that exclude an address for any node of a computer network. Various examples of non-computer-network (as used herein, "non-network") objects have been provided herein above.

The method 1000 may further include, at 1020, receiving, by the at least one computer server, a new address request with the corresponding location information from the at least one client device generated by the user interface application, for each non-network object. The new address request may be generated by the distributed application operating on the at least one client device, and may be received via the computer network, for example via the Internet, or via a combination of the Internet and a wireless telephone network.

The method 1000 may further include, at 1030, determining, by the at least one computer server, a numeric address for the each non-network object based at least in part on its selected type (i.e., address type) that is not used as an address for any other object of an identical type. Determination of the network address may include execution of an algorithm for generating an entirely numeric address as disclosed elsewhere herein. The address types may be or may include, without limitation, any one or more of the various Naviaddress address types described herein above.

The method 1000 may further include, at 1040, maintaining, by the at least one computer server, each numeric address in association with the corresponding location information for the each non-network object as a record in an on-line data structure holding different numeric addresses each associated with a different one of corresponding location information. The on-line data structure may be, or may include, a relational database. The relational database may relate each of the different numeric addresses to a different one of corresponding location information (one-to-one relationship).

The method 1000 may further include, at 1050, serving, by the at least one computer server over the computer network, the corresponding location information for the each non-network object selected from the on-line data structure in response to at least one query containing the each numeric address. The query and its response may be transmitted over the computer network, for example, via the Internet, or via a combination of the Internet and a wireless telephone network.

The method 1000 may include any one or more of additional operations 1100, 1200, 1300, 1400, or 1500 shown in FIGS. 11-15, in any operable order. Each of these additional operations is not necessarily performed in every embodiment of the method, and the presence of any one of the operations 1100, 1200, 1300, 1400, or 1500 does not necessarily require that any other of these additional operations also be performed.

Figure 11:
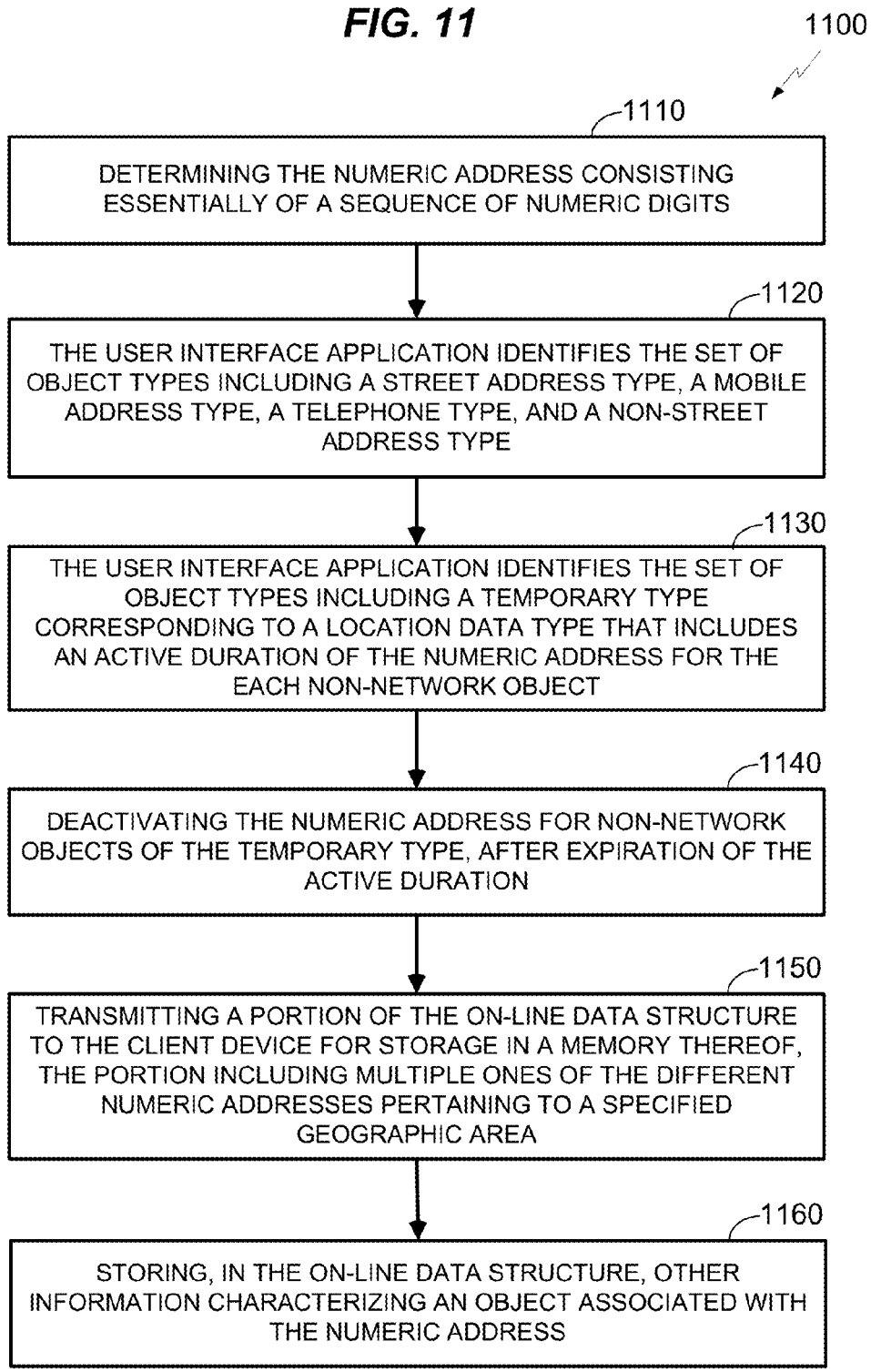

Referring to FIG. 11, the method 1000 may further include, at 1110, determining the numeric address consisting or, or consisting essentially of, a sequence of numeric digits.

In an aspect 1120 of the method 1000, the user interface application identifies the set of object types including a street address type, a mobile address type, a telephone type, and a non-street address type, as described in more detail herein above, including without limitation any of the various Naviaddress address types described herein above. A non-street address type is a geographic location that does not have a street address, or that requires more than a street address to definitely locate, e.g., "Gorky Park, South end of the duck pond." In an alternative, or in addition, the user interface application identifies the set of object types including a temporary type corresponding to a location data type that includes an active duration of the numeric address for the each non-network object. For example, the active duration may be a definite period of time such as, for example, one hour, one day, one week or one month, or an indefinite period of time such as, for example, while an identified object (e.g., a vessel or package) is in transit. In such embodiments, the method 1000 may include, at 1140, deactivating the numeric address for non-network objects of the temporary type, after expiration of the active duration. After the numeric address is deactivated, it may be reused to indicate a different temporary location.

The method 1000 may further include, at 1150, transmitting a portion of the on-line data structure to the client device for storage in a memory thereof, the portion including multiple ones of the different numeric addresses pertaining to a specified geographic area. The client device may locally store part of the address database and use it to response to user inquiries without needing to connect to the server for a period of time. For example, a user may periodically download and store the latest portion of the location data for her city of residence, or a city she is visiting. The client device may first search its locally cached copy of the data when responding to an address inquiry, and connect to the network only if the address is not found. This may enable faster response and relieve network load, for example, by transmitting database information to the local client at low-traffic times.

The method 1000 may further include, at 1160, storing, in the on-line data structure, other information characterizing an object associated with the numeric address. For example, the client device may provide descriptive information in the form of (for example) text, photographs, web links, or video, in connection with a location for which a numeric address is requested. The server may store the descriptive information in a field of the database that is related to the numeric address. In an alternative, the server may automatically search the Internet and pull information into its database that describes or supplements particular addresses.

Referring to FIG. 12, in an aspect 1210 of the method 1000 the user interface application identifies the set of object types including a premium address type characterized by a numeric address shorter than numeric addresses for other non-network object types, corresponding to a location data type that includes a monetary value of the premium address type. In such embodiments, the method 1000 may further include, at 1220, collecting, by the at least one server, payment information in connection with the receiving the new address request of a premium address type.

Referring to FIG. 13, in another aspect 1310 of the method 1000, the user interface application identifies the set of object types including a virtual object type corresponding to a location data type that includes an identification of a virtual modeled environment in which the non-network object exists. In another aspect 1320 of the method 1000, the user interface application identifies the set of object types including a mobile address type corresponding to a location data type that includes a network address including tracking data for the each non-network object.

Figure 14:
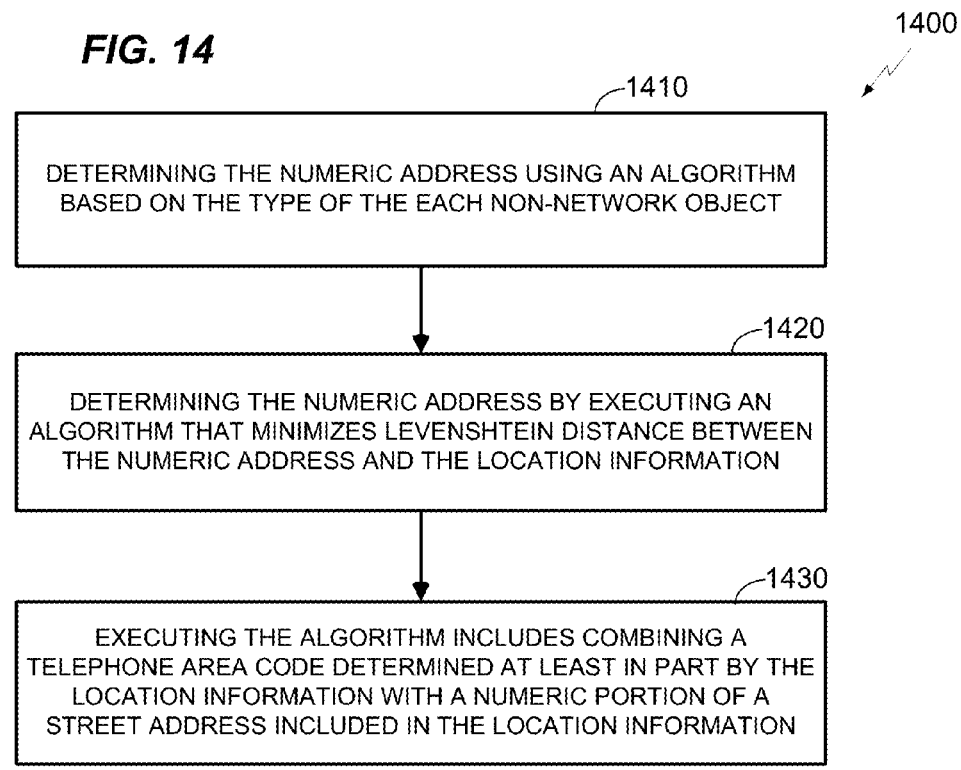

Referring to FIG. 14, the method 1000 may further include, at 1410, determining the numeric address using an algorithm based on the type of the each non-network object. For example, the method may include, at 1420, determining the numeric address by executing an algorithm that minimizes Levenshtein distance between the numeric address and the location information. In another aspect 1430, executing the algorithm may include combining a telephone area code determined at least in part by the location information with a numeric portion of a street address included in the location information. Aspects of minimizing the Levenshtein distance may be implemented as described herein above.

Figure 15:
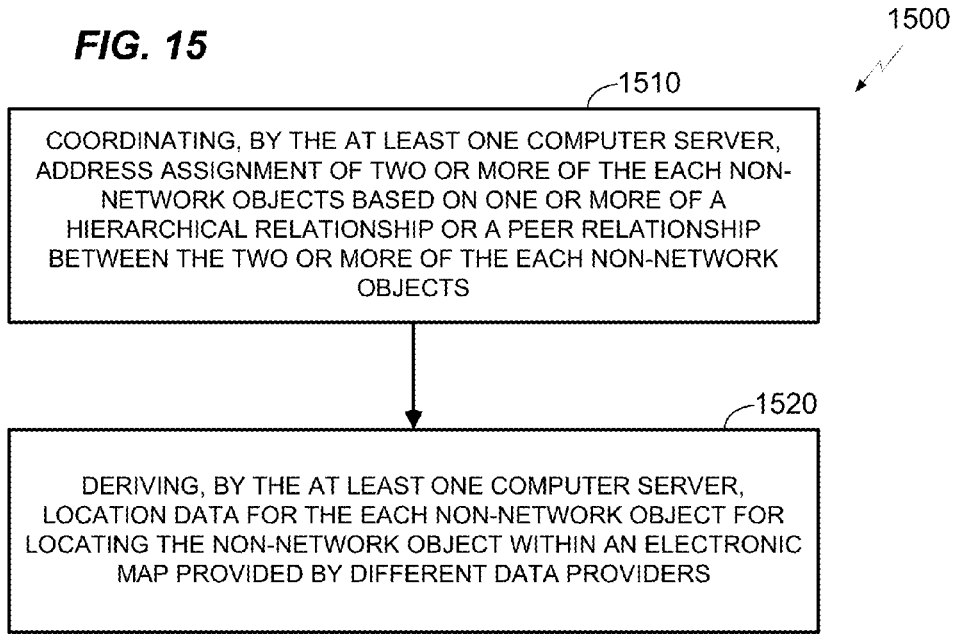

Referring to FIG. 15, the method 1000 may further include, at 1520, coordinating, by the at least one computer server, address assignment of two or more of the each non-network objects based on one or more of a hierarchical relationship or a peer relationship between the two or more of the each non-network objects. In such embodiments, the method may further include, at 1520, deriving, by the at least one computer server, location data for the each non-network object for locating the non-network object within an electronic map provided by different data providers.

Figure 16:
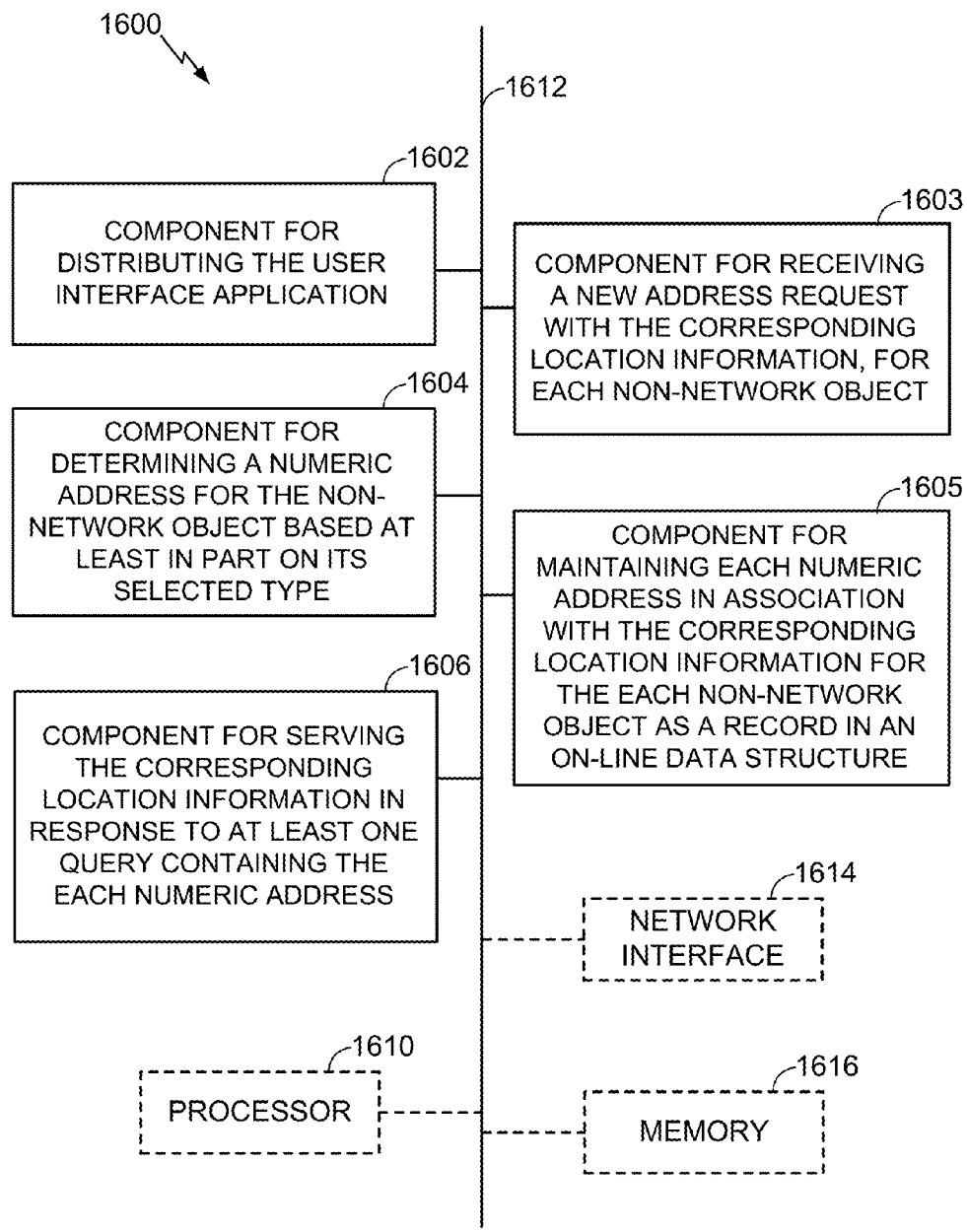
FIG. 16 is a block diagram illustrating aspects of an apparatus for generation and use of numeric identifiers for locating objects and navigating in spatial maps.

FIG. 16 is a conceptual block diagram illustrating components of an apparatus or system 1600 for providing and managing a Naviaddress. The apparatus or system 1600 may include additional or more detailed components as described herein. For example, the processor 1610 and memory 1616 may contain an instantiation of a user terminal and storage system as described herein above, including the more detailed components pointed out in FIG. 1 and other ancillary components. As depicted, the apparatus or system 1600 may include functional blocks that can represent functions implemented by a processor, software, or combination thereof (e.g., firmware).

As illustrated in FIG. 16, the apparatus or system 1600 may comprise an electrical component 1602 for a distributing a user interface application to at least one client device over a computer network, wherein the user interface application is configured to receive user input selecting a type of a non-network object from a set of object types each characterized by a different location data type, obtaining corresponding location information for the non-network object according to its characteristic location data type at least in part from user input, sending the corresponding location information to the at least one computer server, and requesting assignment of a unique numeric address for the non-network object. The component 1602 may be, or may include, a means for said distributing. Said means may include the processor 1610 coupled to the memory 1616, and to the network interface 1614, the processor executing an algorithm based on program instructions stored in the memory. Such algorithm may include a sequence of more detailed operations, for example, receiving a destination address, retrieving the user interface address from a data store as an executable data package configured for installation on the requesting user terminal, and sending the data package to the user terminal.

The apparatus or system 1600 may comprise an electrical component 1603 for receiving a new address request with the corresponding location information from the at least one client device generated by the user interface application, for each non-network object. The component 1603 may be, or may include, a means for said receiving. Said means may include the processor 1610 coupled to the memory 1616, and to the network interface 1614, the processor executing an algorithm based on program instructions stored in the memory. Such algorithm may include a sequence of more detailed operations, for example, as described herein above in connection with FIG. 4.

The apparatus or system 1600 may comprise an electrical component 1604 for distributing a numeric address for the each non-network object based at least in part on its selected type that is not used as an address for any other object of an identical type. The component 1604 may be, or may include, a means for said distributing. Said means may include the processor 1610 coupled to the memory 1616, and to the network interface 1614, the processor executing an algorithm based on program instructions stored in the memory. Such algorithm may include a sequence of more detailed operations, for example, responding to queries from user terminals, generating or retrieving a unique numeric address for each object as described in more detail herein above, and sending a responsive numeric address over the computer network in response to each of the queries.

The apparatus or system 1600 may comprise an electrical component 1605 for maintaining each numeric address in association with the corresponding location information for the each non-network object as a record in an on-line data structure holding different numeric addresses each associated with a different one of corresponding location information. The component 1605 may be, or may include, a means for said maintaining. Said means may include the processor 1610 coupled to the memory 1616, and to the network interface 1614, the processor executing an algorithm based on program instructions stored in the memory. Such algorithm may include a sequence of more detailed operations, for example, executing a relational database application, and generating write operations containing the different numeric addresses for corresponding location information.

The apparatus or system 1600 may comprise an electrical component 1606 for serving over the computer network, the corresponding location information for the each non-network object selected from the on-line data structure in response to at least one query containing the each numeric address. The component 1606 may be, or may include, a means for said serving. Said means may include the processor 1610 coupled to the memory 1616, and to the network interface 1614, the processor executing an algorithm based on program instructions stored in the memory. Such algorithm may include a sequence of more detailed operations, for example, receiving queries each including a numeric Naviaddress or Navipin associated with respective network address sources, holding network addresses for the respective sources in a register in association with a query identifier; retrieving location information based on the numeric Naviaddresses or Navipins from a database, and sending the location information in response to the queries based on he information stored in the register.

The apparatus 1600 may optionally include a processor module 1610 having at least one processor, in the case of the apparatus 1600 configured as a one or more controllers for a user terminal and server (storage unit) in communication with the user terminal over a network interface. The processor 1610, in such case, may be in operative communication with the modules 1602-1606 via a bus 1612 or similar communication coupling. The processor 1610 may effect initiation and scheduling of the processes or functions performed by electrical components 1602-1606.

In related aspects, the apparatus 1600 may include a network interface module 16 operable for communicating with one or more user terminals over a computer network. In further related aspects, the apparatus 1600 may optionally include a module for storing information, such as, for example, a memory device/module 1616. The computer readable medium or the memory module 1616 may be operatively coupled to the other components of the apparatus 1600 via the bus 1612 or the like. The memory module 1616 may be adapted to store computer readable instructions and data for effecting the processes and behavior of the modules 1602-1606, and subcomponents thereof, or the processor 1610, or the method 1000 and one or more of the additional operations 1100-1500 disclosed herein. The memory module 1616 may retain instructions for executing functions associated with the modules 1602-1606. While shown as being external to the memory 1616, it is to be understood that the modules 1602-1606 can exist within the memory 1616.

Thus, the technical solution proposed here, based on the use of a universal navigational address, allows to identify the location of any object in any place, including moving and virtual objects, and may be used to geotag photo and video materials, to track moving objects, to identify an object in a virtual environment or to identify a virtual object in a real world. The use of the navigational address does not involve any difficulties when transferring it by different communication means (by telephone, computer, SMS, etc.) and helps avoid the loss of information on the object location.

In view of the exemplary systems described herein above, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. Certain aspects disclosed herein may be performed using computing devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with certain aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, system-on-a-chip, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a DVD disk, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC or may reside as discrete components in another device.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD), Blu-ray™ . . . ), smart cards, and flash memory devices (e.g., card, stick). Those skilled in the art will recognize many modifications may be made to this configuration without departing from the scope of the disclosed aspects.

The previous description of the disclosed aspects is provided to enable any person skilled in the art to make or use the present disclosure. The examples provided above are to be regarded in an illustrative sense rather than a restrictive sense. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method, comprising:

distributing, by at least one computer server, a user interface application to at least one client device over a computer network, the user interface application configured for receiving user input selecting a type of a non-network object from a set of object types each characterized by a different location data type, obtaining corresponding location information for the non-network object according to its characteristic location data type at least in part from user input, sending the corresponding location information to the at least one computer server, and requesting assignment of a unique numeric address for the non-network object;

receiving, by the at least one computer server, a new address request with the corresponding location information from the at least one client device generated by the user interface application, for each non-network object;

determining, by the at least one computer server, a numeric address for the each non-network object based at least in part on its selected type that is not used as an address for any other object of an identical type;

maintaining, by the at least one computer server, each numeric address in association with the corresponding location information for the each non-network object as a record in an on-line data structure holding different numeric addresses each associated with a different one of the corresponding location information; and serving, by the at least one computer server over the computer network, the corresponding location information for the each non-network object selected from the on-line data structure in response to at least one query containing the each numeric address.

2. The method of claim 1, wherein the determining comprises determining the numeric address consisting essentially of a sequence of numeric digits.

3. The method of claim 1, wherein the set of object types comprises a street address type, a mobile address type, a telephone type, and a non-street address type.

4. The method of claim 3, wherein the set of object types further comprises a temporary type corresponding to a location data type that includes an active duration of the numeric address for the each non-network object, and further comprising deactivating the numeric address for non-network objects of the temporary type, after expiration of the active duration.

5. The method of claim 3, wherein the set of object types further comprises a premium address type characterized by a numeric address shorter than numeric addresses for other non-network object types, corresponding to a location data type that includes a monetary value of the premium address type, and further comprising collecting, by the at least one server, payment information in connection with the receiving the new address request of a premium address type.

6. The method of claim 3, wherein the set of object types further comprises a virtual object type corresponding to a location data type that includes an identification of a virtual modeled environment in which the non-network object exists.

7. The method of claim 1, wherein the set of object types comprises a mobile address type corresponding to a location data type that includes a network address including tracking data for the each non-network object.

8. The method of claim 1, wherein the determining further comprises determining the numeric address using an algorithm based on the type of the each non-network object.

9. The method of claim 1, further comprising transmitting a portion of the on-line data structure to the client device for storage in a memory thereof, the portion including multiple ones of the different numeric addresses pertaining to a specified geographic area.

10. The method of claim 1, further comprising storing, in the on-line data structure, other information characterizing an object associated with the numeric address.

11. The method of claim 1, wherein the determining further comprises determining the numeric address by executing an algorithm that minimizes Levenshtein distance between the numeric address and the location information.

12. The method of claim 11, wherein executing the algorithm comprises combining a telephone area code determined at least in part by the location information with a numeric portion of a street address included in the location information.

13. The method of claim 1, further comprising coordinating, by the at least one computer server, address assignment of two or more of the each non-network objects based on one or more of a hierarchical relationship or a peer relationship between the two or more of the each non-network objects.

14. The method of claim 1, further comprising deriving, by the at least one computer server, location data for the each non-network object for locating the non-network object within an electronic map.

15. An apparatus for providing location information, comprising:

a processor, a memory coupled to the processor, and a network interface device coupled to the processor, wherein the memory holds instructions that when executed by the processor, cause the apparatus to perform the operations of:

distributing a user interface application to at least one client device over a computer network, the user interface application configured for receiving user input selecting a type of a non-network object from a set of object types each characterized by a different location data type, obtaining corresponding location information for the non-network object according to its characteristic location data type at least in part from user input, sending the corresponding location information to the apparatus, and requesting assignment of a unique numeric address for the non-network object;

receiving a new address request with the corresponding location information from the at least one client device generated by the user interface application, for each non-network object;

determining a numeric address for the each non-network object based at least in part on its selected type that is not used as an address for any other object of an identical type;

maintaining each numeric address in association with the corresponding location information for the each non-network object as a record in an on-line data structure holding different numeric addresses each associated with a different one of the corresponding location information; and serving the corresponding location information for the each non-network object selected from the on-line data structure in response to at least one query containing the each numeric address.

16. The apparatus of claim 15, wherein the memory holds further instructions for determining the numeric address consisting essentially of a sequence of numeric digits.

17. The apparatus of claim 15, wherein the memory holds further instructions for defining the set of object types comprising a street address type, a mobile address type, a telephone type, and a non-street address type, and a temporary type corresponding to a location data type that includes an active duration of the numeric address for the each non-network object.

18. The apparatus of claim 17, wherein the memory holds further instructions for deactivating the numeric address for non-network objects of the temporary type, after expiration of the active duration.

19. The apparatus of claim 15, wherein the memory holds further instructions for defining the set of object types including a premium address type corresponding to a location data type, characterized by a numeric address shorter than numeric addresses for other non-network object types associated with a monetary value of the premium address type.

20. The apparatus of claim 15, wherein the memory holds further instructions for defining the set of object types including a virtual object type corresponding to a location data type that includes an identification of a virtual modeled environment in which the non-network object exists.

21. The apparatus of claim 15, wherein the memory holds further instructions for defining the set of object types including a mobile address type corresponding to a location data type that includes a network address including tracking data for the each non-network object.

22. The apparatus of claim 15, wherein the memory holds further instructions for selecting an algorithm for determining the numeric address at least in part based on the type of the each non-network object.

23. The apparatus of claim 15, wherein the memory holds further instructions for determining the numeric address at least in part by executing an algorithm that minimizes Levenshtein distance between the numeric address and the location information.

24. A non-transitory computer-readable medium, encoded with instructions that, when executed by a processor, cause a computer server to perform the operations of:
  distributing a user interface application to at least one client device over a computer network, the user interface application configured for receiving user input selecting a type of a non-network object from a set of object types each characterized by a different location data type, obtaining corresponding location information for the non-network object according to its characteristic location data type at least in part from user input, sending the corresponding location information to the computer server, and requesting assignment of a unique numeric address for the non-network object;
  receiving a new address request with the corresponding location information from the at least one client device generated by the user interface application, for each non-network object;
  determining a numeric address for the each non-network object based at least in part on its selected type that is not used as an address for any other object of an identical type;
  maintaining each numeric address in association with the corresponding location information for the each non-network object as a record in an on-line data structure holding different numeric addresses each associated with a different one of the corresponding location information; and
  serving the corresponding location information for the each non-network object selected from the on-line data structure in response to at least one query containing the each numeric address.

25. A navigation apparatus, comprising:
  means for distributing a user interface application to at least one client device over a computer network, the user interface application configured for receiving user input selecting a type of a non-network object from a set of object types each characterized by a different location data type, obtaining corresponding location information for the non-network object according to its characteristic location data type at least in part from user input, sending the corresponding location information to the computer server, and requesting assignment of a unique numeric address for the non-network object;
  means for receiving a new address request with the corresponding location information from the at least one client device generated by the user interface application, for each non-network object;
  means for determining a numeric address for the each non-network object based at least in part on its selected type that is not used as an address for any other object of an identical type;
  means for maintaining each numeric address in association with the corresponding location information for the each non-network object as a record in an on-line data structure holding different numeric addresses each associated with a different one of the corresponding location information; and
  means for serving the corresponding location information for the each non-network object selected from the on-line data structure in response to at least one query containing the each numeric address.

* * * * *